(12) United States Patent
Ren et al.

(10) Patent No.: US 12,015,464 B2
(45) Date of Patent: Jun. 18, 2024

(54) CHANNEL MEASUREMENT METHOD AND COMMUNICATIONS APPARATUS

(71) Applicant: Huawei Technologies Co., Ltd., Shenzhen (CN)

(72) Inventors: Xiang Ren, Shanghai (CN); Xiaohan Wang, Shanghai (CN); Huangping Jin, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 17/541,997

(22) Filed: Dec. 3, 2021

(65) Prior Publication Data

US 2022/0094412 A1 Mar. 24, 2022

Related U.S. Application Data

(63) Continuation of application No. PCT/CN2020/090551, filed on May 15, 2020.

(30) Foreign Application Priority Data

Jun. 6, 2019 (CN) .......................... 201910493700.1

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0639* (2013.01)

(58) Field of Classification Search
CPC ..................................................... H04B 7/0626
(Continued)

(56) References Cited

U.S. PATENT DOCUMENTS 9,077,572 B1 7/2015 Hueda et al.
9,107,105 B2 8/2015 Zhang
(Continued)

FOREIGN PATENT DOCUMENTS

CN 103281272 A 9/2013
CN 104067582 A 9/2014
(Continued)

OTHER PUBLICATIONS

"3rd Generation Partnership Project; Technical Specification Group Radio Access Network; Study on channel model for frequencies from 0.5 to 100 GHz (Release 15)," 3GPP TR 38.901 V15.0.0, Jun. 2018, 91 Pages.

(Continued)

*Primary Examiner* — Lihong Yu
(74) *Attorney, Agent, or Firm* — SLATER MATSIL, LLP

(57) ABSTRACT

A channel measurement method and a communications apparatus, the method including generating, by a terminal device, first indication information, where the first indication information indicates one or more component features of a time-varying feature, and further indicates a weighting coefficient of each component feature of the one or more component features, and the one or more component features and the weighting coefficient of each component feature represent the time-varying feature of a channel, and sending, by the terminal device, the first indication information to a network device.

24 Claims, 6 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2005/0113141 A1* | 5/2005 | Felter ................... | H04B 1/7103 455/562.1 |
| 2009/0003416 A1* | 1/2009 | Yu ..................... | H04L 25/03343 375/267 |
| 2013/0034180 A1* | 2/2013 | Liu ................... | H04L 25/03949 375/267 |
| 2015/0009897 A1* | 1/2015 | Wilhelmsson ........ | H04L 1/0007 370/328 |
| 2017/0141826 A1 | 5/2017 | Kim et al. | |
| 2018/0183628 A1 | 6/2018 | Kim et al. | |
| 2019/0253181 A1* | 8/2019 | Rahman ............... | H04B 7/0639 |

FOREIGN PATENT DOCUMENTS

| | | |
|---|---|---|
| CN | 105684336 A | 6/2016 |
| CN | 109450500 A | 3/2019 |
| CN | 109768818 A | 5/2019 |
| WO | 2019028765 A1 | 2/2019 |

OTHER PUBLICATIONS

"Discussion on QCL," Agenda item: 5.1.2.4.7, Source: Qualcomm Incorporated, Document for: Discussion/Decision, 3GPP TSG RAN WG1 NR Ad-Hoc#2, R1-1711176, Jun. 27-30, 2017, Qingdao, China, 4 pages.

"Further Enhancements on Type-II CSI Reporting: Doppler-domain Approach," Agenda Item: 7.2.8.6—Others, Source: Fraunhofer IIS, Fraunhofer HHI, Document for: Decision, 3GPP TSG RAN WG1 Meeting #96-Bis, R1-1904219, Xi'an, China Apr. 8-12, 2019, 6 pages.

* cited by examiner

CHANNEL MEASUREMENT METHOD AND COMMUNICATIONS APPARATUS

CROSS-REFERENCE TO RELATED APPLICATIONS

This application is a continuation of International Application No. PCT/CN2020/090551, filed on May 15, 2020, which claims priority to Chinese Patent Application No. 201910493700.1, filed on Jun. 6, 2019. The disclosures of the aforementioned applications are hereby incorporated by reference in their entireties.

TECHNICAL FIELD

This application relates to the communications field, and more specifically, to a channel measurement method and a communications apparatus.

BACKGROUND

In a massive multiple-input multiple-output (Massive MIMO) technology, a network device can reduce interference between a plurality of users and interference between a plurality of signal flows of a same user by using a precoding technology. Therefore, signal quality is improved, spatial multiplexing is implemented, and spectrum utilization is improved.

Currently, a channel measurement and feedback method is known. A terminal device may perform channel measurement based on a received reference signal, determine a to-be-fed-back precoding vector, and represent, by using a weighted sum of one or more beam vectors, a to-be-fed-back precoding vector determined in each measurement, to feed back the beam vector and a weighting coefficient of each beam vector.

However, for a time-varying channel, through the foregoing feedback, a channel state cannot be fully fed back.

SUMMARY

This application provides a channel measurement method and a communications apparatus, to feed back a time-varying feature of a channel, thereby more fully feeding back a channel state.

According to a first aspect, a channel measurement method is provided. The method includes a terminal device generates first indication information, where the first indication information is used to indicate one or more component features of a time-varying feature and a weighting coefficient of each component feature, and the one or more component features and the weighting coefficient of each component feature are used to represent the time-varying feature of a channel, and the terminal device sends the first indication information to a network device.

It should be understood that, the method may be performed by the terminal device, or may be performed by a chip disposed in the terminal device.

According to a second aspect, a channel measurement method is provided. The method includes a network device receives first indication information, where the first indication information is used to indicate one or more component features of a time-varying feature and a weighting coefficient of each component feature, and the one or more component features and the weighting coefficient of each component feature are used to represent the time-varying feature of a channel, and the network device determines, based on the first indication information, the one or more component features and the weighting coefficient of each component feature.

It should be understood that, the method may be performed by the network device, or may be performed by a chip disposed in the network device.

Therefore, based on the foregoing solution, the terminal device may quantize the time-varying feature of the channel by using the one or more component features and the one or more weighting coefficients, and feed back quantization information of the component feature and the weighting coefficient to the network device. In this way, the network device can determine a change of the channel in time domain, and can more fully learn of a channel state, to make a more proper decision for downlink scheduling.

With reference to the first aspect or the second aspect, in some implementations, the one or more component features and the weighting coefficient of each component feature are determined by the terminal device based on reference signals received a plurality of times.

The one or more component features and the weighting coefficient of each component feature are used to represent the time-varying feature of the channel. Therefore, the one or more component features and the weighting coefficient of each component feature may be determined based on the reference signals received a plurality of times. The reference signals received a plurality of times may be reference signals received by the terminal device at a plurality of different moments. Channel measurement is performed based on the reference signals received at the different moments, so that the terminal device can determine the time-varying feature of the channel, and further quantize the time-varying feature by using the one or more component features and the one or more weighting coefficients.

With reference to the first aspect or the second aspect, in some implementations, a weighted sum of the one or more component features is used to represent the time-varying feature of the channel.

In an implementation, the time-varying feature of the channel may be the weighted sum of the one or more component features.

With reference to the first aspect or the second aspect, in some implementations, when the first indication information is used to indicate the one or more component features of the time-varying feature, the first indication information is specifically used to indicate an index of a time domain vector corresponding to each component feature in a predefined codebook.

In embodiments of this application, the time domain vector may be a representation form of the component feature of the time-varying feature. Each component feature may correspond to one time domain vector. The time domain vector may be used to represent the change of the channel in time domain. Each time domain vector in the codebook may be used to represent a change rule of the channel with time.

Therefore, the terminal device may determine the time-varying feature of the channel based on the received reference signal, and then quantize the time-varying feature by using the one or more time domain vectors and the one or more weighting coefficients, to feed back the quantized time-varying feature of the channel to the network device.

With reference to the first aspect or the second aspect, in some implementations, at least two component features are determined based on different codebooks.

In other words, the at least two component features and weighting coefficients corresponding to the at least two component features are determined based on different codebooks.

To obtain a more accurate feedback of the terminal device, the terminal device may determine the time domain vector based on different codebooks. In other words, the terminal device may determine the component feature based on different codebooks. In an implementation, the terminal device may determine a plurality of spatial-frequency vector pairs based on a feedback manner for dual-domain compression, where the plurality of spatial-frequency vector pairs are spatial-frequency vector pairs used to construct a precoding matrix. The terminal device may select weighting coefficients corresponding to some or all of the spatial-frequency vector pairs to determine the one or more component features and the weighting coefficient of each component feature. In correspondence to a spatial-frequency vector pair of a weighting coefficient with a larger amplitude, a codebook with a larger dimension may be used to select a time domain vector. In correspondence to a spatial-frequency vector pair of a weighting coefficient with a smaller amplitude, a codebook with a smaller dimension may be used to select a time domain vector.

With reference to the first aspect or the second aspect, in some implementations, the one or more component features are determined based on one or more predefined codebooks, the one or more codebooks are obtained from a predefined codebook set, and each codebook in the codebook set corresponds to a value of one or more of the following, including measurement duration, a pilot time-domain density, a quantity of pilot transmissions, or a pilot transmission periodicity.

That the one or more component features are determined based on one or more predefined codebooks may alternatively be replaced with that the one or more component features and the weighting coefficient of each component feature are determined based on one or more predefined codebooks.

To obtain a more accurate feedback of the terminal device, codebooks with a plurality of different dimensions may be defined. A codebook with a higher dimension is more accurate than a codebook with a lower dimension. The terminal device may perform channel measurement by using codebooks of different precision, to obtain feedbacks of different precision.

With reference to the first aspect or the second aspect, in some implementations, the component feature of the time-varying feature is a Doppler shift, and the weighting coefficient of the component feature is a Doppler coefficient.

A radio channel is a time-varying channel. The change of the channel in time domain may be represented by a weighted sum of exponential functions of several slowly varying Doppler shifts. Therefore, in an implementation, the component feature of the time-varying feature is a Doppler shift, and the weighting coefficient of the component feature is a Doppler coefficient.

The Doppler shift may correspond to the time domain vector. In the embodiments of this application, different time domain vectors may represent a change rule of the channel in time domain caused by Doppler shifts on different transmission paths. In other words, a mathematical expression of the Doppler shift may be the time domain vector.

According to a third aspect, a communications apparatus is provided. The communications apparatus includes modules or units configured to perform the method according to any one of the first aspect and the possible implementations of the first aspect.

According to a fourth aspect, a communications apparatus is provided. The communications apparatus includes a processor. The processor is coupled to a memory, and may be configured to execute instructions in the memory, to implement the method according to any one of the first aspect and the possible implementations of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a fifth aspect, a communications apparatus is provided. The communications apparatus includes modules or units configured to perform the method according to any one of the second aspect and the possible implementations of the second aspect.

According to a sixth aspect, a communications apparatus is provided. The communications apparatus includes a processor. The processor is coupled to a memory, and may be configured to execute instructions in the memory, to implement the method according to any one of the second aspect and the possible implementations of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to receive a signal through the input circuit, and transmit a signal through the output circuit, to enable the processor to perform the method according to any one of the first aspect and the second aspect and the possible implementations of the first aspect and the second aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eighth aspect, a processing apparatus is provided. The processing apparatus includes a processor and a memory. The processor is configured to read instructions stored in the memory, and may receive a signal by using a receiver, and transmit a signal by using a transmitter, to perform the method according to any one of the first aspect and the second aspect and the possible implementations of the first aspect and the second aspect.

Optionally, there are one or more processors, and there are one or more memories.

Optionally, the memory may be integrated with the processor, or the memory and the processor may be separately disposed.

In a specific implementation process, the memory may be a non-transitory memory, for example, a read-only memory (ROM). The memory and the processor may be integrated into one chip, or may be disposed in different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or an instruction). When the computer program is run, a computer is enabled to perform the method according to any one of the first aspect and the second aspect and the possible implementations of the first aspect and the second aspect.

According to a tenth aspect, a computer-readable medium is provided. The computer-readable medium stores a computer program (which may also be referred to as code or an instruction). When the computer program is run on a computer, the computer is enabled to perform the method according to any one of the first aspect and the second aspect and the possible implementations of the first aspect and the second aspect.

According to an eleventh aspect, a communications system is provided. The communications system includes the foregoing network device and terminal device.

DETAILED DESCRIPTION OF ILLUSTRATIVE EMBODIMENTS

The following describes technical solutions in this application with reference to the accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Figure 1:
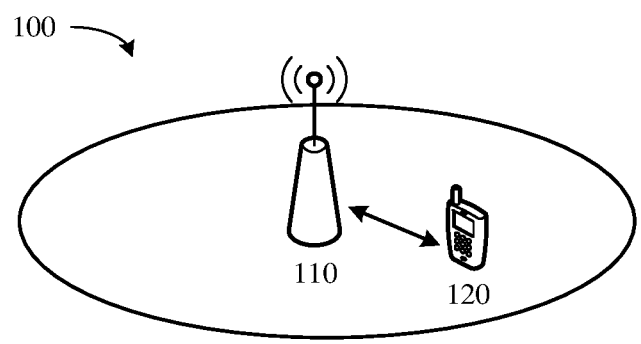
FIG. 1 is a schematic diagram of a communications system to which a method according to an embodiment of this application is applicable.

For ease of understanding of the embodiments of this application, a communications system shown in FIG. 1 is first used as an example to describe in detail a communications system to which the embodiments of this application are applicable. FIG. 1 is a schematic diagram of a communications system 100 to which a channel measurement method according to an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. For each communications device in the communications system 100, the plurality of configured antennas may include at least one transmit antenna configured to send a signal and at least one receive antenna configured to receive a signal. Therefore, the communications devices in the communications system 100, for example, the network device 110 and the terminal device 120, may communicate with each other by using a multi-antenna technology.

It should be understood that, the network device in the communications system may be any device that has a wireless transceiver function. The network device includes but is not limited to an evolved NodeB (eNB), a radio network controller (RNC), a NodeB (NB), a base station controller (BSC), a base transceiver station (BTS), a home base station (a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like, or may be a gNB or a transmission point (TRP or TP) in a 5G system, for example, an NR system, or one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and a non-real-time service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that, the network device may be a device including one or more of a CU node, a DU node, or an AAU node. In addition, the CU may be classified into a network device in an access network (RAN), or may be classified into a network device in a core network (CN). This is not limited in this application.

It should be further understood that, the terminal device in the wireless communications system may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, a mobile terminal disposed in a vehicle, or the like. An application scenario is not limited in the embodiments of this application.

It should be further understood that, FIG. 1 is merely a simplified schematic diagram used as an example for ease of understanding. The communications system 100 may further include another network device or another terminal device, which is not shown in FIG. 1.

For ease of understanding of the embodiments of this application, the following briefly describes a process in which a downlink signal is processed at a physical layer before being sent. It should be understood that, the processing process of the downlink signal described below may be performed by the network device, or may be performed by a chip disposed in the network device. For ease of description, the network device and the chip disposed in the network device are collectively referred to as network devices below.

The network device may process a codeword on a physical channel. The codeword may be a coded bit obtained through coding (for example, including channel coding). The codeword is scrambled (scrambling) to generate a scrambled bit. Modulation mapping is performed on the scrambled bit, to obtain a modulated symbol. Through layer mapping, the modulated symbol is mapped to a plurality of layers. The layers are also referred to as transport layers. A modulated symbol obtained through the layer mapping is precoded, to obtain a precoded signal. The precoded signal is mapped to a plurality of resource elements (REs) through RE mapping. These REs are then transmitted through an antenna port after orthogonal multiplexing (OFDM) modulation is performed on the REs.

It should be understood that, the processing process of the downlink signal described above is merely an example for description, and this shall not constitute any limitation on this application. For a specific processing process of the downlink signal, refer to the conventional technology. For brevity, detailed descriptions of the specific process are omitted herein.

For ease of understanding of the embodiments of this application, the following first describes terms in the embodiments of this application briefly.

1. Precoding technology: When a channel state is known, a sending device (for example, the network device) may process a to-be-sent signal by using a precoding matrix that matches the channel state, so that a precoded to-be-sent signal adapts to a channel, thereby reducing complexity of eliminating inter-channel impact by a receiving device (for example, the terminal device). Therefore, after the to-be-sent signal is precoded, quality (for example, a signal to interference plus noise ratio (SINR)) of a received signal is improved. Therefore, by using the precoding technology, the sending device and a plurality of receiving devices may perform transmission on a same time-frequency resource. In other words, multi-user multiple-input multiple-output (MU-MIMO) is implemented.

It should be understood that, related descriptions of the precoding technology are merely examples for ease of understanding, and are not intended to limit the protection scope of the embodiments of this application. In a specific implementation process, the sending device may alternatively perform precoding in another manner. For example, when channel information (for example, but not limited to a channel matrix) cannot be learned of, precoding is performed by using a preset precoding matrix or through weighted processing. For brevity, specific content of the precoding manner is not further described in this specification.

2. Reference signal (RS): The reference signal may also be referred to as a pilot, a reference sequence, or the like. In the embodiments of this application, the reference signal may include a non-precoded reference signal (non-precoded RS) and a precoded reference signal. The precoded reference signal may also be referred to as a beamformed reference signal (beamformed RS), or may also be referred to as a precoded reference signal for short. In the following embodiments, meanings expressed by the precoded reference signal, the precoded reference signal, and the beamformed reference signal are the same.

In addition, when a reference signal is mentioned below, sometimes the reference signal only refers to a non-precoded reference signal, sometimes the reference signal only refers to a precoded reference signal, and sometimes the reference signal includes a non-precoded reference signal and a precoded reference signal. A person skilled in the art may understand meanings expressed by the reference signal in different scenarios.

The non-precoded reference signal may be similar to a class A reference signal defined in an LTE or NR protocol. The beamformed reference signal may be similar to a class B reference signal in the LTE protocol.

It should be understood that, the reference signal in the embodiments of this application may be a reference signal used for channel measurement. For example, the reference signal may be a channel state information reference signal (CSI-RS) or a sounding reference signal (SRS). However, it should be understood that the foregoing listed descriptions are merely examples, and this shall not constitute any limitation on this application. This application does not exclude a possibility of defining another reference signal in a future protocol to implement a same or similar function.

3. Antenna port: The antenna port is referred to as a port for short. The antenna port may be understood as a virtual antenna identified by the receiving device, or a transmit antenna that is spatially distinguishable. One antenna port may be configured for each virtual antenna, and each virtual antenna may be a weighted combination of a plurality of physical antennas.

In a possible design, the antenna port may be a transmit antenna port. The transmit antenna port may be an actually independent transceiver unit (TxRU). A quantity of antenna ports (that is, a quantity of transmit antenna ports) may be equal to a quantity of TxRUs. A reference signal of each port may be a non-precoded reference signal.

In another possible design, the antenna port may be a port of a precoded reference signal. For example, a reference signal of each port may be a precoded reference signal obtained by precoding a reference signal based on one precoding vector. The signal of each port may be transmitted by using one or more resource blocks (RBs). It may be understood that, if the reference signal is precoded, a quantity of ports of the reference signal may be less than a quantity of transmit antenna ports before precoding is performed. Therefore, dimension reduction on the transmit antenna port can be implemented by precoding the reference signal, thereby reducing pilot overheads.

4. Time domain vector: The time domain vector may be used to represent a change of a channel in time domain. Each time domain vector may represent a change rule of the channel with time. A radio channel is a time-varying channel, and suffers from attenuation losses from different paths. For example, a time-frequency dual selective fading channel, which is affected by both frequency selective fading caused by a multipath delay spread and time selective fading caused by a Doppler shift, is a typical time-varying channel.

The Doppler shift may be a shift between a transmit frequency and a receive frequency caused by relative movement between the terminal device and the network device, and a difference between the receive frequency and the transmit frequency is referred to as the Doppler shift. Generally, the Doppler shift $f_d$ may be defined as that $f_d = v \times f_c \times \cos\theta / c$. v is a moving speed of the terminal device, $f_c$ is a carrier frequency, $\theta$ is an angle of incidence of a multipath signal, and c is the speed of light. During specific implementation, angles $\theta$ of incidence of different transmission paths may be considered. Because angles $\theta$ of incidence of a plurality of paths are different, different transmission paths correspond to different Doppler shifts, causing a Doppler spread. Generally, a value of the Doppler shift indicates impact of the moving speed on a speed of the change of the channel in time domain.

In the embodiments of this application, each time domain vector may correspond to one Doppler shift. Therefore, different time domain vectors may be used to represent a change rule of the channel in time domain caused by Doppler shifts on different transmission paths. Generally, for ease of describing the change of the channel in time domain, the time domain channel may be projected to a Doppler domain, and the change is represented by weighting exponential functions of several slowly varying Doppler shifts.

It should be understood that, the time domain vector is defined merely for ease of distinguishing from a spatial domain vector and a frequency domain vector described below, and this shall not constitute any limitation on this application. This application does not exclude a possibility of defining another name for the time domain vector in a future protocol to represent a meaning the same as or similar to that of the time domain vector. For example, the time domain vector may also be referred to as a Doppler vector.

Optionally, the time domain vector is one or more of a discrete Fourier transform (DFT) vector, an oversampled DFT vector, a wavelet transform (WT) vector, or an oversampled WT vector. This is not limited in this application.

5. Codebook: The codebook in the embodiments of this application may be a set of time domain vectors. A plurality of time domain vectors in a same codebook may be vectors with a same dimension. For example, if time domain vectors in a same codebook are all N-dimensional vectors, the codebook is an N-dimensional codebook.

Optionally, time domain vectors in a same codebook are all DFT vectors. The codebook may include N time domain vectors, and every two of the N time domain vectors may be orthogonal to each other. In other words, the codebook is an orthogonal codebook. A DFT matrix may be constructed by using the N time domain vectors in the codebook. In other words, the time domain vector may be a vector obtained from a DFT matrix.

For example, the N time domain vectors in the N-dimensional codebook may be vectors obtained from a DFT matrix whose dimensions are N×N. An $n^{th}$ (n=0, 1, . . . , or N−1) vector in the N-dimensional codebook may be, for example:

$$[e^{-j2\pi \times 0 \times n/N} e^{-j2\pi \times 1 \times n/N} e^{-j2\pi \times (N-1) \times n/N}]^T.$$

It should be understood that, the vector shown above is merely an example, and this shall not constitute any limitation on this application. A specific form of the time domain vector is not limited in this application.

In an implementation, the N-dimensional codebook may be understood as that a maximum Doppler shift is equally divided into N parts, and the N time domain vectors in the N-dimensional codebook correspond to N Doppler shifts. For different values of n, different Doppler shifts may be determined. For example, a ratio of a Doppler shift corresponding to the $n^{th}$ vector in the N-dimensional codebook to the maximum Doppler shift is n/N. Therefore, a Doppler shift corresponding to one time domain vector may be determined based on the time domain vector. In other words, each time domain vector corresponds to one Doppler shift.

The maximum Doppler shift may be determined according to the calculation formula of the Doppler shift that is shown above: $f_d = v \times f_c \times \cos\theta / c$. Assuming that the moving speed v of the terminal device remains unchanged and the carrier frequency $f_c$ remains unchanged, the maximum Doppler shift may be that $f_d = v \times f_c \times /c$, that is, $\cos\theta$ is 1. Alternatively, the maximum Doppler shift may be that $f_d = v \times f_c \times \cos \theta_0 / c$, where $\theta_0$ is an angle of a direct path between a base station and the terminal device.

Optionally, time domain vectors in a same codebook are all oversampled DFT vectors. The orthogonal codebook including the DFT vectors may be extended into a plurality of subsets by using an oversampling factor $O_f$ (where $O_f$ is a positive integer greater than 1). Each subset may include N time domain vectors, and every two of the N time domain vectors are orthogonal to each other. An oversampled DFT matrix may be constructed by using a plurality of time domain vectors in the codebook. The codebook may be defined as a non-orthogonal codebook. The time domain vector may be a vector obtained from the non-orthogonal codebook, or may be a vector obtained from one of a plurality of orthogonal subsets.

It should be understood that, when the orthogonal codebook including the DFT vectors is extended into a plurality of orthogonal subsets by using the oversampling factor, the plurality of orthogonal subsets may also be defined as a plurality of codebooks. This is not limited in this application.

Optionally, time domain vectors in a same codebook are all WT vectors. The codebook may include N time domain vectors, and every two of the N time domain vectors are orthogonal to each other. In other words, the codebook is an orthogonal codebook. A WT matrix may be constructed by using the N time domain vectors in the codebook. In other words, the time domain vector may be a vector obtained from a DFT matrix.

Optionally, time domain vectors in a same codebook are all oversampled WT vectors. The orthogonal codebook including the WT vectors may be extended into a plurality of subsets by using an oversampling factor. Each subset may include N time domain vectors, and every two of the N time domain vectors are orthogonal to each other. An oversampled WT matrix may be constructed by using a plurality of time domain vectors in the codebook. The codebook may be defined as a non-orthogonal codebook. The time domain vector may be a vector obtained from the non-orthogonal codebook, or may be a vector obtained from one of a plurality of orthogonal subsets.

It should be understood that, when the orthogonal codebook including the WT vectors is extended into a plurality of orthogonal subsets by using the oversampling factor, the plurality of orthogonal subsets may also be defined as a plurality of codebooks. This is not limited in this application.

A plurality of codebooks may form a codebook set. A plurality of codebooks in the codebook set may be codebooks with different dimensions. In other words, dimensions of time domain vectors obtained from different codebooks may be different.

Optionally, each codebook in the codebook set corresponds to a value of one or more of the following, including measurement duration, a pilot time-domain density, a quantity of pilot transmissions, or a pilot transmission periodicity.

For related descriptions about the measurement duration, the pilot time-domain density, the quantity of pilot transmissions, and the pilot transmission periodicity, refer to the following related descriptions.

A larger quantity of pilot transmissions may correspond to a codebook with a larger dimension. A smaller quantity of pilot transmissions may correspond to a codebook with a smaller dimension.

When the pilot transmission periodicity or the pilot time-domain density is fixed, longer measurement duration indicates a larger quantity of times that the terminal device receives reference signals, which may correspond to a codebook with a larger dimension, shorter measurement duration indicates a smaller quantity of times that the terminal device receives reference signals, which may correspond to a codebook with a smaller dimension.

When the measurement duration is fixed, a larger pilot time-domain density indicates a larger quantity of times that the terminal device receives reference signals within a period of time (for example, the measurement duration), which may correspond to a codebook with a larger dimension, a smaller pilot time-domain density indicates a smaller quantity of times that the terminal device receives reference signals within a same period of time, which may correspond to a codebook with a smaller dimension.

When the measurement duration is fixed, a longer pilot transmission periodicity indicates a smaller quantity of times that the terminal device receives reference signals within a period of time (for example, the measurement duration), which may correspond to a codebook with a smaller dimension, a shorter pilot transmission periodicity indicates a larger quantity of times that the terminal device receives reference signals within a same period of time, which may correspond to a codebook with a larger dimension.

Certainly, the foregoing factors may alternatively be combined. For example, the dimension of the codebook may correspond to the measurement duration and the pilot transmission periodicity, or the dimension of the codebook may correspond to the measurement duration and the pilot time-domain density. For brevity, examples are not described one by one herein.

It should be understood that, the factors that are related to the dimension of the codebook and that are listed above are merely examples, and this shall not constitute any limitation on this application. Based on a same concept, a person skilled in the art may make equivalent substitutions to the foregoing factors, but these equivalent substitutions shall all fall within the protection scope of this application.

6. Spatial domain vector: The spatial domain vector is also referred to as a beam vector, an angle vector, or the like. Each element in the spatial domain vector may represent a weight of each antenna port. Based on the weight of each antenna port that is represented by each element in the spatial domain vector, signals of the antenna ports are linearly superposed, to form an area with a relatively strong signal in a direction in space. A reference signal is precoded based on the spatial domain vector, so that the transmitted reference signal has specific spatial directivity. Therefore, a process of precoding the reference signal based on the spatial domain vector may also be considered as a process of performing spatial domain precoding.

For ease of description below, it is assumed that the spatial domain vector is denoted as u. A length of the spatial domain vector u may be a quantity $N_s$ of transmit antenna ports in one polarization direction, where $N_s$ is an integer greater than or equal to 1. The spatial domain vector may be, for example, a column vector or a row vector whose length is $N_s$. This is not limited in this application.

Optionally, the spatial domain vector is obtained from a DFT matrix. Each column vector in the DFT matrix may be referred to as a DFT vector. In other words, the spatial domain vector may be a DFT vector. The spatial domain vector may alternatively be, for example, a two-dimensional (2D)-discrete Fourier transform (DFT) vector or an oversampled 2D-DFT vector defined in a type II codebook in the NR protocol TS 38.214 Release 15 (R15). For brevity, details are not described herein again.

7. Frequency domain vector: The frequency domain vector is also referred to as a delay vector or the like. The frequency domain vector is a vector that may be used to represent a change rule of the channel in frequency domain. Each frequency domain vector may represent a change rule. When a signal is transmitted through a radio channel, the signal may be transmitted from a transmit antenna to a receive antenna through a plurality of paths. A multipath delay results in frequency selective fading, that is, the change of the channel in frequency domain. Therefore, different frequency domain vectors may be used to represent a change rule of the channel in frequency domain caused by delays on different transmission paths. However, because a phase change of the channel in each frequency domain unit is related to a delay, it can be learned from the Fourier transform that a time delay of a signal in time domain may be equivalent to a phase gradient in frequency domain. Therefore, the frequency domain vector may also be referred to as a delay vector. In other words, the frequency domain vector may also be used to represent a delay feature of the channel.

That a reference signal is precoded based on the frequency domain vector may essentially mean that phase rotation is performed on each frequency domain unit in frequency domain based on an element in the frequency domain vector, to pre-compensate, by using a precoded reference signal, a frequency selective feature caused by a multipath delay. Therefore, a process of precoding the reference signal based on the frequency domain vector may be considered as a process of performing frequency domain precoding.

In the embodiments of this application, the frequency domain vector and the spatial domain vector may be used to construct a plurality of combinations of spatial domain vectors and frequency domain vectors, which are also referred to as spatial-frequency vector pairs for short, to construct a precoding vector.

For ease of description below, it is assumed that the frequency domain vector is denoted as v. A length of the frequency domain vector may be denoted as $N_3$, where $N_3$ is an integer greater than or equal to 1.

8. Spatial-frequency vector pair: One spatial-frequency vector pair may be obtained by combining one spatial domain vector and one frequency domain vector. One spatial-frequency vector pair may include one spatial domain vector and one frequency domain vector. One spatial-frequency component matrix may be obtained by using a spatial domain vector and a frequency-domain vector in one spatial-frequency vector pair. For example, one spatial-frequency component matrix may be obtained by multiplying one spatial-frequency vector by a conjugate transpose of one frequency-domain vector.

In the embodiments of this application, spatial domain vectors and/or frequency domain vectors included in any two spatial-frequency vector pairs are different. In other words, spatial-frequency component matrices constructed by any two spatial-frequency vector pairs are also different.

9. Spatial-frequency matrix: The spatial-frequency matrix may be understood as an intermediate quantity used to determine a precoding matrix corresponding to each frequency domain unit. For the terminal device, the spatial-frequency matrix may be determined based on the precoding matrix or a channel matrix corresponding to each frequency domain unit. For the network device, the spatial-frequency matrix may be obtained based on a weighted sum of a plurality of spatial-frequency component matrices, and is used to restore a downlink channel or the precoding matrix.

For example, the spatial-frequency matrix may be noted as H, and $H = [w_1 \ w_2 \ \ldots \ w_{N_3}]$, $w_1$ to $w_{N_3}$ are $N_3$ column vectors corresponding to $N_3$ frequency domain units, each column vector may be a precoding matrix corresponding to each frequency domain unit, and a length of each column vector may be $N_s$. The $N_3$ column vectors correspond to precoding vectors of the $N_3$ frequency domain units. That is, the spatial-frequency matrix may be considered as a joint matrix formed by combining the precoding vectors corresponding to the $N_3$ frequency domain units.

In addition, the spatial-frequency matrix may correspond to a transport layer. A precoding vector of each frequency domain unit on a same transport layer may be used to construct a spatial-frequency matrix corresponding to the transport layer. For example, a precoding vector of each frequency domain unit on a $z^{th}$ (where $1 \leq z \leq Z$, and z is a positive integer) transport layer may be used to construct a spatial-frequency matrix corresponding to the $z^{th}$ transport layer. Z represents a quantity of transport layers, and Z is a positive integer.

It should be understood that, the spatial-frequency matrix is merely a representation form of an intermediate quantity used to determine a precoding matrix, and this shall not constitute any limitation on this application. For example, the column vectors in the spatial-frequency matrix are successively arranged end to end from left to right, or are arranged according to another predefined rule, to obtain a vector whose length is $N_s \times N_3$. The vector may be referred to as a spatial-frequency vector.

It should be further understood that, the foregoing dimensions of the spatial-frequency matrix and the spatial-frequency vector are merely examples, and this shall not constitute any limitation on this application. For example, the spatial-frequency matrix may alternatively be a matrix whose dimensions are $N_3 \times N_s$. Each row vector may correspond to one frequency domain unit, and may be used to determine a precoding vector of the corresponding frequency domain unit.

In addition, when a plurality of polarization directions are configured for a transmit antenna, the dimensions of the spatial-frequency matrix may further be increased. For example, for a transmit antenna in dual polarization directions, the dimensions of the spatial-frequency matrix may be $2N_s \times N_3$ or $N_3 \times 2N_s$. It should be understood that, a quantity of polarization directions for the transmit antenna is not limited in this application.

10. Dual-domain compression: Dual-domain compression may include compression of two dimensions: spatial domain compression and frequency domain compression. Spatial domain compression may specifically mean that one or more spatial domain vectors are selected from a spatial domain vector set, as a vector used to construct a precoding vector. Frequency domain compression may mean that one or more frequency domain vectors are selected from a frequency domain vector set, as a vector used to construct a precoding vector. As described above, for example, a matrix constructed by using one spatial domain vector and one frequency domain vector may be referred to as a spatial-frequency component matrix. The one or more selected spatial domain vectors and the one or more selected frequency domain vectors may be used to construct one or more spatial-frequency component matrices. A weighted sum of the one or more spatial-frequency component matrices may be used to construct a spatial-frequency matrix corresponding to one transport layer. In other words, the spatial-frequency matrix may approximate to the weighted sum of the spatial-frequency component matrix that is constructed by using the one or more selected spatial domain vectors and the one or more selected frequency domain vectors. Based on a spatial-frequency matrix corresponding to one transport layer, a precoding vector corresponding to each frequency domain unit on the transport layer may be further determined.

Specifically, the one or more selected spatial domain vectors may be used to construct a matrix $W_1$, where each column vector in $W_1$ corresponds to one selected spatial domain vector. The one or more selected frequency domain vectors may be used to construct a matrix $W_3$, where each column vector in $W_3$ corresponds to one selected frequency domain vector. The spatial-frequency matrix H may be represented as a result $H=W_1CW_3^H$ of linear combination of the one or more selected spatial domain vectors and the one or more selected frequency domain vectors.

Using one transport layer as an example, a spatial-frequency matrix corresponding to the transport layer is $H=W_1CW_3^H$.

If an antenna in dual polarization directions is used, L spatial domain vectors may be selected for each polarization direction, and dimensions of $W_1$ may be $2N_s \times 2L$. In a possible implementation, L same spatial vectors $\{b_s^1, b_s^2, \ldots, b_s^L\}$ may be used in the two polarization directions, where for example, $b_s^1, b_s^2, \ldots, b_s^L$ may be L spatial domain vectors selected from the foregoing spatial domain vector set. In this case, $W_1$ may be expressed as $$\begin{bmatrix} b_s^1 & b_s^2 & \cdots & b_s^L & 0 & 0 & 0 & 0 \\ 0 & 0 & 0 & 0 & b_s^1 & b_s^2 & \cdots & b_s^L \end{bmatrix} \cdot b_s^L$$

represents an $l^{th}$ spatial domain vector in the L selected spatial domain vectors, and l=1, 2, . . . , or L.

If M frequency domain vectors are selected, dimensions of $W_3^H$ may be $M \times N_3$. Each column vector in $W_3$ may be one frequency domain vector. In this case, each spatial domain vector in $W_1$ and each frequency domain vector in $W_3$ may be used to construct one spatial-frequency vector pair, and each spatial-frequency vector pair may correspond to one weighting coefficient, so that 2L×M spatial-frequency vector pairs constructed by using the 2L spatial domain vectors and the M frequency domain vectors may be in a one-to-one correspondence with 2L×M weighting coefficients.

C is a coefficient matrix constructed by using the 2L×M weighting coefficients, and may have dimensions of 2L×M. An $l^{th}$ row in the coefficient matrix C may correspond to an $l^{th}$ spatial domain vector in a first polarization direction in the 2L spatial domain vectors, and an $(L+l)^{th}$ row in the coefficient matrix C may correspond to an $l^{th}$ spatial domain vector in a second polarization direction in the 2L spatial domain vectors. An $m^{th}$ column in the coefficient matrix C may correspond to an $m^{th}$ frequency domain vector in the M frequency domain vectors.

It should be understood that, the relationship among the spatial-frequency matrix H, $W_1$, and $W_3$ shown above is merely an example, and this shall not constitute any limitation on this application. A person skilled in the art may perform mathematical transformation on the foregoing relationship based on a same concept, to obtain another calculation formula used to represent the relationship among the spatial-frequency matrix H, $W_1$, and $W_3$. For example, the spatial-frequency matrix H may alternatively be expressed as $H=W_1CW_3$, in this case, each row vector in $W_3$ corresponds to one selected frequency domain vector.

In dual-domain compression, compression is performed in both spatial domain and frequency domain. Therefore, when providing a feedback, the terminal device may feed back the one or more selected spatial domain vectors and the one or more selected frequency domain vectors to the network device, and does not need to feed back, based on each frequency domain unit (for example, a subband), a weighting coefficient (for example, including an amplitude and a phase) of the subband. Therefore, feedback overheads can be greatly reduced. In addition, because a frequency domain vector can represent a change rule of a channel in frequency domain, one or more frequency domain vectors are linearly superposed to simulate a change of the channel in frequency domain. In this way, relatively high feedback precision can still be kept, so that a precoding matrix that is restored by the network device based on the feedback of the terminal device can still well adapt to the channel.

It should be understood that, for ease of understanding of dual-domain compression, terms such as the spatial-frequency matrix and the spatial-frequency vector pair are separately defined above. However, this shall not constitute any limitation on this application. A specific process in which the terminal device determines a precoding matrix indicator (PMI) is an internal implementation behavior of the terminal device. The specific process in which the terminal device determines the PMI is not limited in this application. A specific process in which the network device determines a precoding matrix based on the PMI is an internal implementation behavior of the network device. The specific process in which the network device determines the precoding matrix based on the PMI is not limited in this application either. The terminal device and the network device may separately generate the PMI and restore the precoding matrix by using different algorithms.

11. Weighting coefficient: In the embodiments of this application, two types of weighting coefficients are mainly involved.

One type of weighting coefficient is a weighting coefficient determined based on a feedback manner for dual-domain compression. The weighting coefficient may also be referred to as a spatial-frequency combination coefficient, a spatial-frequency coefficient, or the like. Each weighting coefficient may correspond to one spatial domain vector and one frequency domain vector that are selected to construct a precoding vector, in other words, correspond to one spatial-frequency component matrix, or correspond to one spatial-frequency vector pair. The weighting coefficient may be used to indicate a weight of the constructed precoding vector to a spatial-frequency component matrix constructed by using one spatial domain vector and one frequency domain vector.

The other type of weighting coefficient is a weighting coefficient corresponding to a time domain vector. The weighting coefficient may also be referred to as a time domain coefficient. Each weighting coefficient may correspond to one time domain vector selected to construct a precoding matrix, in other words, correspond to one Doppler shift, and may be used to indicate a weight of each time domain vector for constructing a channel. As described above, the time domain vector may also be referred to as a Doppler vector. Correspondingly, the weighting coefficient may also be referred to as a Doppler coefficient.

For ease of distinguishing and understanding below, a weighting coefficient corresponding to a spatial-frequency vector pair is denoted as a spatial-frequency coefficient, and a weighting coefficient corresponding to a time domain vector is denoted as a time domain coefficient.

It should be understood that, the foregoing listed names are merely defined for ease of distinguishing, and this shall not constitute any limitation on this application. A specific name of the coefficient is not limited in this application.

12. Pilot transmission periodicity: The pilot transmission periodicity is a time interval between two adjacent pilot transmissions.

13. Pilot time-domain density: The pilot time-domain density is a quantity of times that a reference signal is transmitted in a predefined time unit, or a ratio of a time domain resource used to transmit a reference signal this time to the time unit. One time unit may include, for example, one or more pilot transmission periodicities, and a corresponding pilot time-domain density may be, for example, 1 or greater than 1.

14. Measurement duration: In the embodiments of this application, the terminal device may perform channel measurement within a time period based on an indication of the network device. The time period may be referred to as measurement duration. A time length of the time period may be indicated by the network device by using signaling, for example, notified by using higher layer signaling (for example, a radio resource control (RRC) message). The measurement duration may alternatively be predefined, for example, defined in a protocol. This is not limited in this application.

The network device may notify, by using signaling, the terminal device to start to perform channel measurement. For example, the network device may notify the terminal device of a start time and/or duration of the time period by using signaling, or the network device may trigger, by using signaling, the terminal device to start to perform channel measurement. The terminal device may receive, a plurality of times within the measurement duration, reference signals used for channel measurement, and may perform channel measurement based on the reference signals received a plurality of times, to feed back a time-varying feature of a channel to the network device.

It should be understood that, that the network device notifies, by using signaling, the terminal device to start to perform channel measurement does not mean that the terminal device keeps performing channel measurement at the start time or a trigger time indicated by the network device. The network device only notifies, by using signaling, the terminal device that channel measurement can be performed, and the terminal device may perform channel measurement based on the received reference signal within a time window after the start time or the trigger time. A size of the time window is the measurement duration.

It should be further understood that, the feedback herein refers to a feedback of the time-varying feature of the channel by the terminal device, but it does not mean that the terminal device does not provide another feedback. For example, the terminal device may provide a feedback within the time period based on the feedback manner for dual-domain compression, or may provide a feedback within the time period based on a type II codebook feedback manner. For brevity, examples are not listed one by one herein. It should be noted that another feedback provided by the terminal device within this time period is an independent process from the feedback of the time-varying feature of the channel described in this application.

The terminal device may receive reference signals a plurality of times within the measurement duration. A quantity of times that the terminal device receives reference signals within the measurement duration may be a product of a ratio of the measurement duration to the foregoing time unit and the pilot time-domain density.

15. Quantity of pilot transmissions: In the embodiments of this application, the quantity of pilot transmissions may be a total quantity of times that the network device sends reference signals used for channel measurement, or a total quantity of times that the terminal device receives reference signals used for channel measurement. The quantity of pilot transmissions may be specifically a total quantity of pilot transmissions within a period of time. When the quantity of pilot transmissions is greater than 1, the plurality of pilot transmissions may be a plurality of transmissions within the period of time. In other words, the plurality of pilot transmissions are transmissions at a plurality of moments.

The quantity of pilot transmissions may be indicated by the network device by using signaling, for example, higher layer signaling (for example, an RRC message). Alternatively, the quantity of pilot transmissions may be predefined, for example, defined in a protocol. This is not limited in this application.

It should be noted that, in the embodiments of this application, each codebook in a codebook set corresponds to a value of one or more of the following, including measurement duration, a pilot time-domain density, a quantity of pilot transmissions, or a pilot transmission periodicity. A specific manner in which the terminal device determines the values of the measurement duration, the pilot time-domain density, the quantity of pilot transmissions, and the pilot transmission periodicity is not limited in this application.

In an implementation, the network device may directly indicate the value of the measurement duration, the pilot time-domain density, the quantity of pilot transmissions, or the pilot transmission periodicity by using signaling.

In another implementation, the network device may alternatively indicate, by using signaling, a configuration related to the value of the measurement duration, the pilot time-domain density, the quantity of pilot transmissions, or the pilot transmission periodicity. For example, a correspondence between a plurality of configurations and a plurality of values may be predefined in a protocol, and the correspondence may be represented, for example, by using a table or in another manner. The network device may indicate the value of the measurement duration, the pilot time-domain density, the quantity of pilot transmissions, or the pilot transmission periodicity by indicating a configuration or an index of a configuration corresponding to a value. In this case, that "each codebook in the codebook set corresponds to a value of one or more of the following, including measurement duration, a pilot time-domain density, a quantity of pilot transmissions, or a pilot transmission periodicity" may be replaced with that "each codebook in the codebook set corresponds to a configuration of one or more of the following, including measurement duration, a pilot time domain density, a quantity of pilot transmissions, or a pilot transmission periodicity".

In still another implementation, the value of the measurement duration, the pilot time-domain density, the quantity of pilot transmissions, or the pilot transmission periodicity may be predefined, for example, defined in a protocol.

Several specific implementations of determining the value of the measurement duration, the pilot time-domain density, the quantity of pilot transmissions, or the pilot transmission periodicity are listed above. However, this shall not constitute any limitation on this application. Each codebook in the codebook set shall fall within the protection scope of this application, provided that the codebook has a correspondence with one or more of the measurement duration, the pilot time-domain density, the quantity of pilot transmissions, or the pilot transmission periodicity.

The terminal device may feed back CSI based on a reference signal received each time. Using the codebook feedback manner for dual-domain compression as an example, the terminal device may perform channel measurement based on a reference signal received each time, and feed back at least one spatial domain vector, at least one frequency domain vector, and at least one weighting coefficient, so that the network device constructs a precoding matrix. However, such a feedback manner may cause relatively high feedback overheads. For example, if the network device sends reference signals intensively, the terminal device frequently feeds back CSI to the network device.

In view of this, this application provides a channel measurement method. In the channel measurement method provided in this application, channel measurement is performed based on reference signals received a plurality of times, and a time-varying feature is fed back based on a channel measurement result, where a change trend of a channel with time is approximately represented by using a weighted sum of one or more component features of the time-varying feature. Therefore, a result obtained by performing a plurality of measurements within a period of time (for example, measurement duration) is fed back to the network device after being compressed by using the time-varying feature. Compared with the foregoing feedback manner of feeding back the CSI based on the reference signal received each time, this helps reduce the feedback overheads.

The following describes in detail the channel measurement method provided in the embodiments of this application with reference to the FIG. 2(a) to FIG. 2(d) to FIG. 5.

For ease of understanding of the embodiments of this application, the following descriptions are first provided before the embodiments of this application are described.

First, for ease of understanding and description, main parameters in this application are first described as follows.

P: P is a quantity of time domain vectors fed back by the terminal device, and P is an integer greater than or equal to 1.

When the terminal device performs channel measurement based on the codebook feedback manner for dual-domain compression, if the terminal device determines one or more time domain vectors based on one spatial-frequency vector pair, or if the terminal device determines one or more same time domain vectors based on a plurality of spatial-frequency vector pairs, a quantity of time domain vectors fed back by the terminal device is P, and the P time domain vectors are different from each other.

If the terminal device determines one or more time domain vectors based on each of the plurality of spatial-frequency vector pairs, and time domain vectors determined based on at least two spatial-frequency vector pairs are different, the quantity P of time domain vectors fed back by the terminal device may satisfy that $$P = \sum_{k=1}^{K} P_k.$$

$P_k$ indicates a quantity of time domain vectors fed back based on a $k^{th}$ spatial-frequency vector pair, and $P_k$ is an integer greater than or equal to 1.

It should be understood that, defining P as the quantity of time domain vectors fed back by the terminal device above is merely a possible definition manner. For example, P may alternatively be defined as a quantity of time domain vectors fed back based on one transport layer or a quantity of time domain vectors fed back based on one receive antenna. This is not limited in this application.

K: K is a total quantity of spatial-frequency vector pairs used to determine a time domain vector, and K is an integer greater than or equal to 1.

k: k may be any one of 1 to K, and k is an integer. The $k^{th}$ spatial-frequency vector pair may be one of the K spatial-frequency vector pairs.

K': K' is a quantity of spatial-frequency vector pairs used to construct a precoding matrix in dual-domain compression, K'≥K, and K' is an integer.

L: L is a quantity of spatial domain vectors (or angle vectors), the L spatial domain vectors (or angle vectors) may be combined with M frequency domain vectors (or delay vectors) below, to obtain K spatial-frequency vector pairs, and L is an integer greater than or equal to 1.

M: M is a quantity of frequency domain vectors (or delay vectors), the M frequency domain vectors (or delay vectors) may be combined with the L spatial domain vectors (or angle vectors) below, to obtain the K spatial-frequency vector pairs, and M is an integer greater than or equal to 1.

Second, in the embodiments of this application, for ease of description, when numbering is involved, numbers may be consecutive and start from 1. For example, the P time domain vectors include the first time domain vector to a $P^{th}$ time domain vector. By analogy, examples are not described one by one herein. Certainly, specific implementation is not limited thereto. For example, numbers may alternatively be consecutive and start from 0. It should be understood that, the foregoing descriptions are all provided for ease of description of the technical solutions provided in the embodiments of this application, but are not intended to limit the scope of this application.

Third, in the embodiments of this application, transformation of a matrix and a vector is involved in many places. For ease of understanding, unified descriptions are provided herein. A superscript T indicates a transpose. For example, $A^T$ indicates a transpose of a matrix (or vector) A. A superscript H indicates a conjugate transpose. For example, $A^H$ represents a conjugate transpose of a matrix (or vector) A. For brevity, descriptions of a same or similar case are omitted below.

Fourth, in the embodiments of this application, a weighted sum of one or more component features, a weighted sum of one or more time domain vectors, a weighted sum of an exponential function of one or more Doppler shifts, and the like are mentioned in many places.

The component feature is used as an example. When there is only one component feature, the "weighted sum of one or more component features" herein may refer to only one component feature. When there are a plurality of component features, the "weighted sum of one or more component features" herein may represent a result obtained by weighting the plurality of component features based on a weight (or a weighting coefficient) of each component feature. For brevity, descriptions of a same or similar case are omitted below.

Fifth, in the embodiments of this application, the network device may determine a precoding matrix based on a feedback of the terminal device. When the precoding matrix corresponds to one transport layer or one polarization direction, the precoding matrix may alternatively be in a form of a vector, for example, a precoding vector. A specific form of the precoding matrix is not limited in this application. For example, the precoding matrix may be a matrix, or may be a vector.

Sixth, in the embodiments of this application, "being used to indicate" may include "being used to directly indicate" and "being used to indirectly indicate". For example, when a piece of indication information is used to indicate information I, the indication information may directly indicate I or indirectly indicate I, but it does not necessarily indicate that the indication information carries I.

Information indicated by the indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may exist in another equivalent form. For example, a row vector may be represented as a column vector, a matrix may be represented by using a transposed matrix of the matrix or a matrix may be represented in a form of a vector or an array, where the vector or array may be formed by connecting row vectors or column vectors of the matrix, and a Kronecker product of two vectors may be represented in a form such as a product of one vector and a transposed vector of the other vector. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending, and sending periodicities and/or sending occasions of the sub-information may be the same or may be different. A specific sending method is not limited in this application. The sending periodicities and/or the sending occasions of the sub-information may be pre-defined, for example, predefined according to a protocol, or may be configured by a transmit end device by sending configuration information to a receive end device. The configuration information may include but is not limited to one or a combination of at least two of the following, including radio resource control signaling such as RRC signaling, MAC layer signaling such as MAC-CE signaling, and physical layer signaling such as downlink control information (DCI).

Seventh, the terms "first", "second", and various numbers in the following embodiments are merely used for distinguishing for ease of description, and are not intended to limit the scope of the embodiments of this application. For example, the terms are used to distinguish between different indication information.

Eighth, "predefinition" or "preconfiguration" may be implemented by pre-storing corresponding code or a corresponding table in a device (for example, including a terminal device or a network device) or in another manner that can be used to indicate related information. A specific implementation of "predefinition" or "preconfiguration" is not limited in this application. "Storage" may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. The memory may be a storage medium in any form. This is not limited in this application.

Ninth, a "protocol" in the embodiments of this application may be a standard protocol in the communications field, for example, may include an LTE protocol, an NR protocol, and a related protocol applied to a future communications system. This is not limited in this application.

Tenth, "at least one" refers to one or more, and "a plurality of" refers to two or more. The term "and/or" describes an association relationship between associated objects and may indicate three relationships. For example, A and/or B may indicate the following cases: Only A exists, both A and B exist, and only B exists. A and B may be singular or plural. The character "/" usually represents an "or" relationship between the associated objects. "At least one of the following items (pieces)" or a similar expression thereof means any combination of the items, including any combination of one item (piece) or a plurality of items (pieces). For example, at least one of a, b, and c may represent: a, b, c, a and b, a and c, b and c, or a, b, and c, where a, b, and c each may be singular or plural.

Eleventh, in the embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

The following describes in detail the method provided in the embodiments of this application with reference to the accompanying drawings.

The method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be understood that, the method provided in the embodiments of this application is not limited to communication between the network device and the terminal device, and may be further applied to communication between terminal devices. A scenario to which the method is applied is not limited in this application. In embodiments shown below, for ease of understanding and description, interaction between the network device and the terminal device is used as an example to describe in detail the method provided in the embodiments of this application.

It should be further understood that, a specific structure of an execution body of the method provided in the embodiments of this application is not specifically limited in the embodiments shown below, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

Figure 2A:
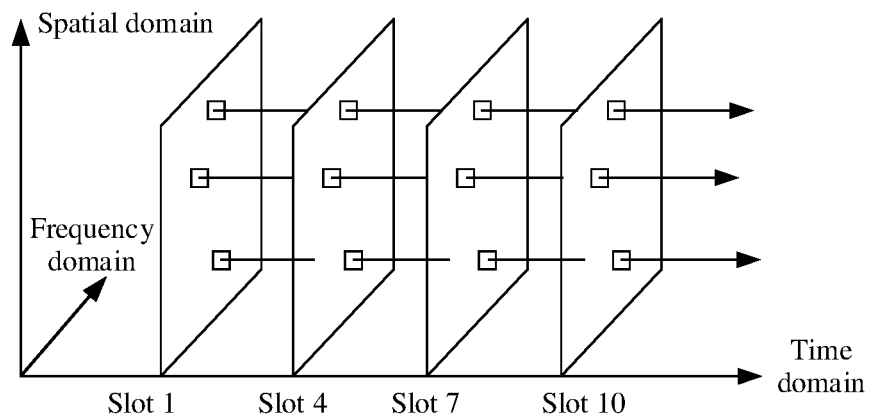
FIG. 2(a) to FIG. 2(d) are a schematic diagram of a principle of a channel measurement method according to an embodiment of this application.
Figure 2B:
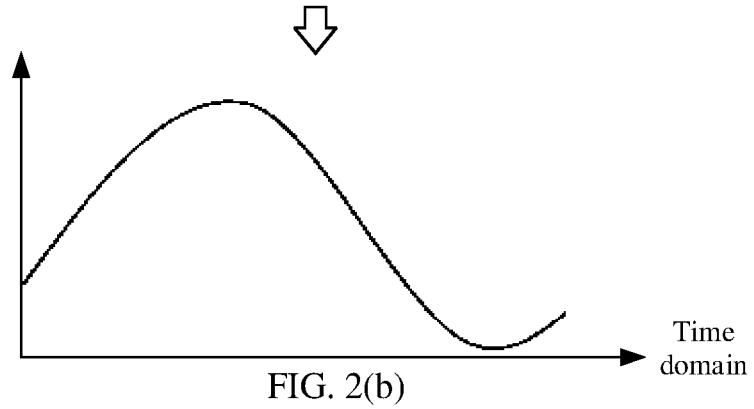
Figure 2C:
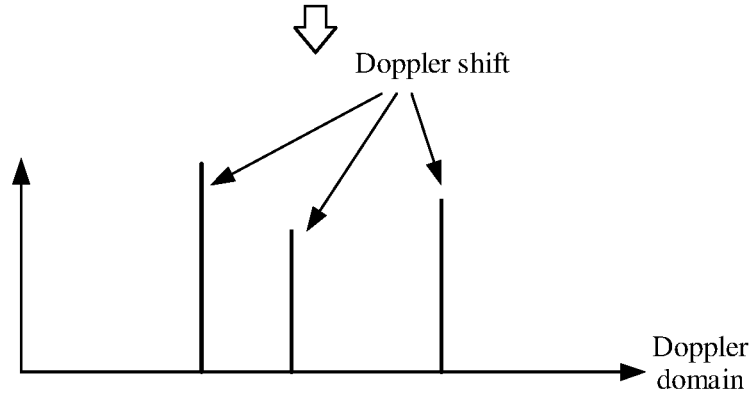
Figure 2D:
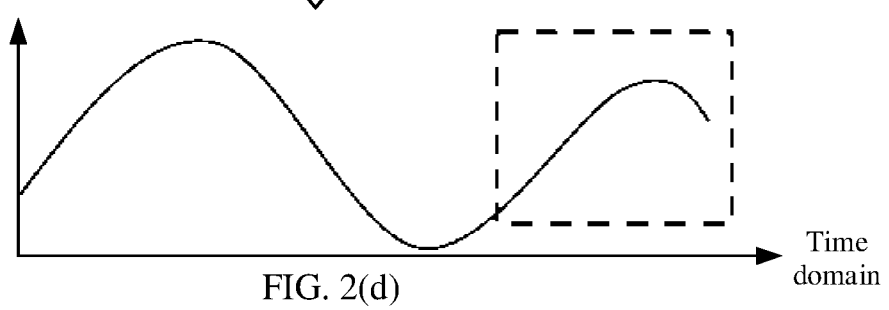

It should be further understood that, for ease of understanding, the method provided in this application is described in detail below by using the feedback manner for dual-domain compression as an example. However, this shall not constitute any limitation on the scenario to which the method provided in this application is applicable. The method provided in this application may be applied to another feedback manner in which a precoding matrix is indicated by feeding back a beam vector and a weighting coefficient, for example, a type II codebook feedback manner. The following first briefly describes a general idea of the channel measurement method provided in the embodiments of this application with reference to FIG. 2(a) to FIG. 2(d). FIG. 2(a), FIG. 2(b), FIG. 2(c), and FIG. 2(d) schematically show a process in which the terminal device converts a change of a channel from a time domain to a Doppler domain. As shown in FIG. 2(a), the terminal device may determine a plurality of spatial-frequency vector pairs in a plane including a spatial domain and a frequency domain, and three spatial-frequency vector pairs (that is, three small squares shown in the figure) are shown in the figure. The terminal device may determine, based on a reference signal received each time, a change of spatial-frequency coefficients of the three spatial-frequency vector pairs with time, and the change may be represented by using a curve, as shown in FIG. 2(b). As described above, the change of the channel in time domain may be represented by using a weighted sum of exponential functions of several slowly varying Doppler shifts. Therefore, the change of the channel is converted from the time domain to the Doppler domain, so that several fixed Doppler shifts may be obtained, as shown in FIG. 2(c). FIG. 2(c) shows three Doppler shifts, coordinates of the three Doppler shifts on a horizontal axis correspond to positions of the three Doppler shifts, and coordinates of the three Doppler shifts on a vertical axis correspond to amplitudes of the three Doppler shifts. If the change of the channel in time domain is represented by using a weighted sum of exponential functions of the three Doppler shifts, time domain compression (in other words, Doppler domain compression) may be performed on the change of the channel in time domain. In addition, based on the change of the channel in time domain, a change of the channel at a future moment may be further predicted, as shown in FIG. 2(d). A curve in a dashed-line box in FIG. 2(d) is a prediction of the channel at the future moment.

Figure 3:
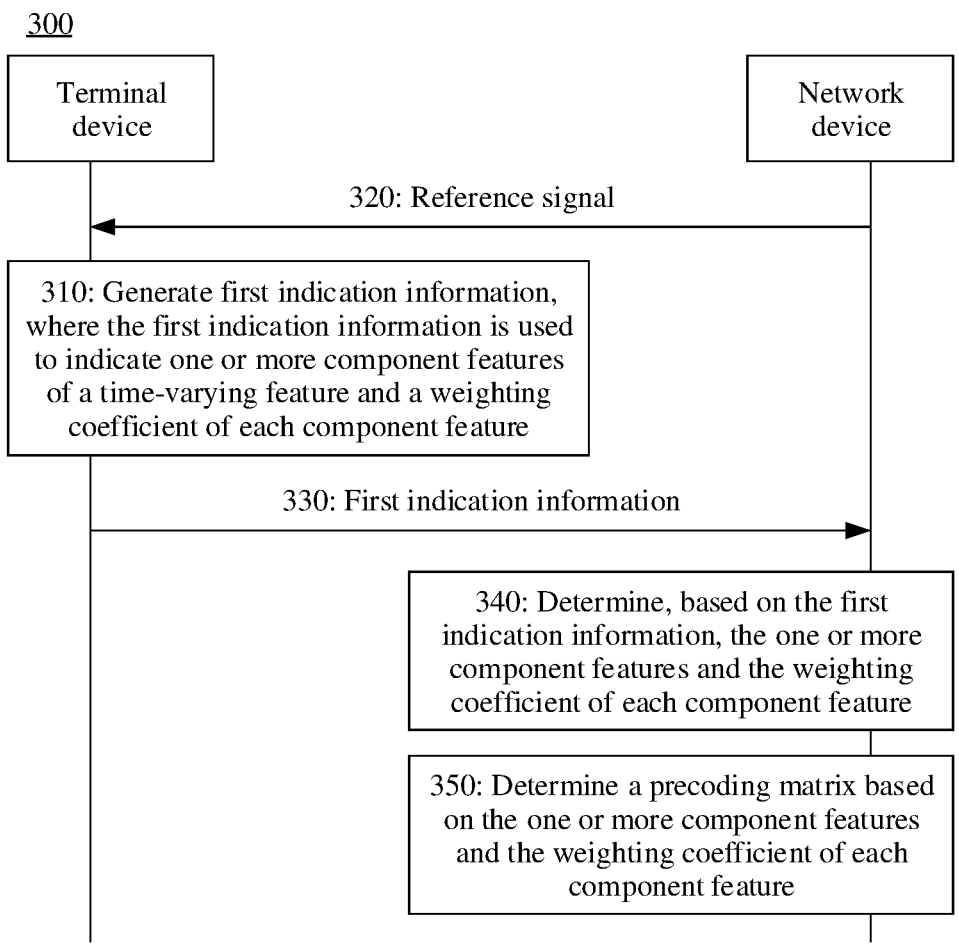
FIG. 3 is a schematic flowchart of a channel measurement method according to an embodiment of this application.

Based on the foregoing idea, the following describes in detail the channel measurement method provided in the embodiments of this application with reference to FIG. 3.

For ease of understanding, in embodiments shown below, a specific process of the channel measurement method provided in the embodiments of this application is described in detail based on one of one or more transport layers and one of one or more polarization directions corresponding to the transport layer. It should be understood that, a quantity of transport layers and a quantity of polarization directions of a transmit antenna are not limited in this application. In the following example, one transport layer may be any one of the one or more transport layers, and one polarization direction may be any one of the one or more polarization directions.

FIG. 3 is a schematic flowchart of a channel measurement method 300 according to an embodiment of this application from a perspective of device interaction. As shown in FIG. 3, the method 300 may include operation 310 to operation 350. The following describes the operations in the method 300 in detail.

Operation 310: A terminal device generates first indication information, where the first indication information is used to indicate one or more component features of a time-varying feature and a weighting coefficient of each component feature.

Specifically, the time-varying feature of a channel may be represented by using a weighted sum of the one or more component features. That is, the time-varying feature of the channel may be represented by using one component feature, or may be represented by using a weighted sum of a plurality of component features.

In a possible implementation, the time-varying feature of the channel may be approximately represented by using a weighted sum of an exponential function of one or more fixed Doppler shifts. A correspondence between a Doppler shift and a time domain vector has been described in detail above, and each time domain vector in a codebook may correspond to one Doppler shift. Therefore, the time-varying feature of the channel may be approximately represented by using a weighted sum of one or more time domain vectors. In other words, the one or more component features described in this embodiment of this application may be one or more time domain vectors selected from a predefined codebook. Each component feature corresponds to one time domain vector, and each time domain vector may be used to determine one Doppler shift.

Therefore, in this embodiment of this application, the time domain vector may be considered as a representation form of the component feature of the time-varying feature. The terminal device may perform channel measurement based on a received reference signal, to determine the one or more time domain vectors and a time domain coefficient corresponding to each time domain vector from the predefined codebook.

It should be understood that, using the weighted sum of the one or more component features to approximately represent the time-varying feature of the channel is merely a possible implementation. This shall not constitute any limitation on this application. A relationship among the one or more component features, the weighting coefficient of each component feature, and the time-varying feature of the channel is not limited thereto.

Optionally, before operation 310, the method 300 further includes Operation 320: The terminal device receives a reference signal. Correspondingly, in operation 320, the network device sends the reference signal.

Because of the time-varying feature of the channel, the terminal device may perform channel measurement based on reference signals received at a plurality of different moments. In other words, the time-varying feature is determined by the terminal device based on reference signals received at a plurality of moments. In other words, the time-varying feature is determined by the terminal device based on reference signals received a plurality of times.

In an implementation, the terminal device may generate the first indication information based on a reference signal received within measurement duration. It should be understood that, the measurement duration may be relatively short, for example, may be defined in a unit of a slot or a millisecond. For example, the measurement duration is 20 slots, 5 ms, 10 ms, or 20 ms. Alternatively, the measurement duration may be relatively long, for example, may be defined in a unit of a second. For example, the measurement duration is 10 seconds.

The measurement duration may be predefined, for example, defined in a protocol. Alternatively, the measurement duration may be preconfigured by the network device. For example, the network device indicates a measurement start time and the measurement duration by using signaling. This is not limited in this application.

In another implementation, the terminal device may receive the reference signal based on a quantity of pilot transmissions, and generate the first indication information based on the received reference signal.

The quantity of pilot transmissions may be predefined, for example, defined in a protocol. Alternatively, the quantity of pilot transmissions may be preconfigured by the network device. For example, the network device indicates the quantity of pilot transmissions by using signaling. This is not limited in this application.

The measurement duration and the quantity of pilot transmissions have been described in detail above. For brevity, details are not described herein again.

It should be noted that, in this embodiment of this application, the terminal device may receive the reference signal based on the measurement duration or the quantity of pilot transmissions, to perform channel measurement. Regardless of whether the terminal device receives the reference signal based on the measurement duration or receives the reference signal based on the quantity of pilot transmissions, the terminal device may perform channel measurement based on reference signals received a plurality of times, to determine the one or more time domain vectors used to represent the time-varying feature of the channel and the time domain coefficient corresponding to the time domain vector.

For ease of description below, it is assumed that the terminal device determines, based on reference signals received N times, the one or more time domain vectors and the time domain coefficient corresponding to the time domain vector, and then generates the first indication information. N may be a quantity of times of receiving the reference signal within the measurement duration, or may be the quantity of pilot transmissions. This is not limited in this application.

For ease of understanding and description, the following uses dual-domain compression as an example to describe in detail a specific process in which the terminal device determines the one or more time domain vectors and the time domain coefficient corresponding to the time domain vector.

The terminal device determines the channel based on a reference signal received each of the N times, and then uses the weighted sum of the one or more time domain vectors to approximately represent a change of the channel with time. Specifically, the terminal device performs channel measurement based on a reference signal received an $n^{th}$ (where $1 \leq n \leq N$, and n is an integer) time in the N times, to obtain a spatial-frequency matrix $H_n$. The spatial-frequency matrix may be understood as a manner of representing the channel. A spatial-frequency matrix obtained during each channel measurement may be approximately represented by using a weighted sum of a plurality of spatial-frequency vector pairs. Generally, within specific measurement duration, when a plurality of spatial-frequency vector pairs used to construct a precoding matrix remain unchanged, based on a change of spatial-frequency coefficients of the plurality of spatial-frequency vector pairs with time, the change of the channel with time may be approximately represented by using the weighted sum of the one or more time domain vectors.

The plurality of spatial-frequency vector pairs used to approximately represent the spatial-frequency matrix may be determined by the terminal device based on a feedback manner for dual-domain compression. The plurality of spatial-frequency vector pairs may be used to construct a precoding matrix. For example, the plurality of spatial-frequency vector pairs may be determined during the first measurement in a plurality of measurements, or may be determined during the last channel measurement in a plurality of measurements, or may be determined during any measurement in a plurality of measurements. This is not limited in this application. In other words, the terminal device may perform channel measurement after receiving the reference signals N times, or may perform channel measurement each time a reference signal is received. It should be understood that, channel measurement is an internal implementation behavior of the terminal device. This is not limited in this application.

The terminal device may determine, based on some or all of the plurality of spatial-frequency vector pairs, one or more time domain vectors that may be used for weighting and a time domain coefficient of each time domain vector, to approximately represent the time-varying feature of the channel by using a weighted sum of the one or more time domain vectors. For ease of description, it is assumed that a quantity of time domain vectors fed back by the terminal device to the network device is P, where P is an integer greater than or equal to 1.

Optionally, the method 300 further includes the terminal device receives second indication information, where the second indication information is used to indicate a value of P. Correspondingly, the network device sends the second indication information, where the second indication information is used to indicate the value of P.

That is, the value of P may be indicated by the network device to the terminal device by using signaling. The terminal device may select, based on the value of P indicated by the network device, a corresponding quantity of spatial-frequency vector pairs for reporting, and determine a time domain vector. In other words, the network device may preconfigure, for the terminal device by using signaling, the quantity of time domain vectors that need to be reported.

For example, the second indication information may be carried in higher layer signaling. For example, the higher layer signaling may be a radio resource control (RRC) message. Specific signaling used to carry the second indication information is not limited in this application.

Optionally, the method 300 further includes the terminal device sends third indication information, where the third indication information is used to indicate a value of P. Correspondingly, the network device receives the third indication information, where the third indication information is used to indicate the value of P.

That is, the value of P may be determined by the terminal device, and reported to the network device by using signaling.

For example, the terminal device may determine the value of P based on a maximum value $P_0$ of available values of P indicated by the network device, where $P \leq P_0$, and $P_0$ is a positive integer. Optionally, the method 300 further includes the terminal device receives fourth indication information, where the fourth indication information is used to indicate the maximum value $P_0$ of P. Correspondingly, the network device sends the fourth indication information, where the fourth indication information is used to indicate the maximum value $P_0$ of P.

In other words, the network device may preconfigure, for the terminal device by using signaling, the quantity of time domain vectors that need to be reported. A quantity of time domain vectors actually reported by the terminal device may be equal to or less than the quantity, preconfigured by the network device, of time domain vectors that need to be reported. For example, the fourth indication information may be carried in higher layer signaling. For example, the higher layer signaling may be an RRC message. Specific signaling used to carry the fourth indication information is not limited in this application.

It should be understood that, the third indication information and the first indication information may be carried in the same signaling, for example, a CSI report, or may be carried in different signaling, for example, existing or newly added signaling. This is not limited in this application.

Optionally, the value of P is predefined, for example, defined in a protocol.

A specific method for determining the value of P and a specific value of P are not limited in this application.

When the terminal device performs channel measurement based on the codebook feedback manner for dual-domain compression, the value of P may alternatively be a quantity of time domain vectors determined based on one or more (for example, K) spatial-frequency vector pairs, or may be a quantity of time domain vectors determined based on one transport layer. The value of P has been described in detail above with reference to different cases. For brevity, details are not described herein again.

When the terminal device performs channel measurement based on another feedback manner, for example, a type II codebook feedback manner, the value of P may alternatively be a quantity of time domain vectors determined based on one beam vector, or may be a quantity of time domain vectors determined based on a plurality of beam vectors, or may be a quantity of time domain vectors determined based on one transport layer.

It should be understood that, the foregoing definition of the value of P is merely an example, and this shall not constitute any limitation on this application. A specific definition of P is not limited in this application. Based on a same inventive concept, a person skilled in the art may make equivalent substitutions to the definition of P, and these equivalent substitutions shall all fall within the protection scope of this application.

In this embodiment of this application, the terminal device may determine, based on the predefined codebook, the P time domain vectors and the time domain coefficient corresponding to each time domain vector, to approximately represent the time-varying feature of the channel. The following describes in detail a specific process in which the terminal device determines the P time domain vectors and the time domain coefficient of each time domain vector.

Still using dual-domain compression as an example, the terminal device may determine, based on a change of the spatial-frequency coefficients corresponding to the K spatial-frequency vector pairs with time, the P time domain vectors and the time domain coefficients corresponding to the P time domain vectors. K is an integer greater than or equal to 1.

In an embodiment, the first indication information is used to indicate the P time domain vectors and the P time domain coefficients corresponding to the P time domain vectors. The weighted sum of the P time domain vectors may be used to approximately represent the change of the spatial-frequency coefficients of the spatial-frequency vector pairs with time.

In other words, the terminal device may jointly determine, based on the K spatial-frequency vector pairs, the P time domain vectors and the P time domain coefficients corresponding to the P time domain vectors.

The K spatial-frequency vector pairs used to determine the time domain vectors may be K spatial-frequency vector pairs determined based on the feedback manner for dual-domain compression. When the terminal device jointly determines the P time domain vectors and the P time domain coefficients based on the K spatial-frequency vector pairs, the terminal device may perform determining based on one of the K spatial-frequency vector pairs, for example, a strongest spatial-frequency vector pair in the K spatial-frequency vector pairs, or the terminal device may perform determining based on the K spatial-frequency vector pairs, for example, a weighted average of the K spatial-frequency vector pairs, or the terminal device may perform determining based on some of the K spatial-frequency vector pairs. This is not limited in this application. However, it should be understood that this does not mean that the terminal device selects only one spatial-frequency vector pair or selects only the K spatial-frequency vector pairs to construct the precoding matrix when feeding back a PMI based on dual-domain compression. When feeding back the PMI based on dual-domain compression, the terminal device may use more (for example, K' below, where $K' \geq K$, and K' is an integer) spatial-frequency vector pairs to construct the precoding matrix.

In this embodiment, the P time domain vectors and the P time domain coefficients corresponding to the P time domain vectors may be jointly determined based on the foregoing K spatial-frequency vector pairs. When the network device constructs the precoding matrix based on the K' spatial-frequency vector pairs and spatial-frequency coefficients of the K' spatial-frequency vector pairs below, the P time domain vectors and the P time domain coefficients corresponding to the P time domain vectors may be shared by the K spatial-frequency vector pairs. In other words, when the K spatial-frequency vector pairs are used to construct the precoding matrix, spatial-frequency coefficients corresponding to any two spatial-frequency vector pairs are the same.

Because the terminal device jointly determines the P time domain vectors and the P time domain coefficients based on the K spatial-frequency vector pairs, it may be considered that a quantity of time domain vectors corresponding to each spatial-frequency vector pair is P. In addition, a quantity of time domain coefficients of a time domain vector corresponding to each spatial-frequency vector pair is P. A time domain vector and a time domain coefficient corresponding to each spatial-frequency vector pair may be used to determine a spatial-frequency coefficient of the spatial-frequency vector pair.

It may be understood that, because any two spatial-frequency vector pairs correspond to P same time domain vectors, any two spatial-frequency vector pairs correspond to P same time domain coefficients. Therefore, the terminal device may indicate the P time domain vectors and the P time domain coefficients by using the first indication information. In other words, the terminal device indicates the P time domain vectors and the time domain coefficients corresponding to the P time domain vectors only once. In other words, the terminal device may indicate, by using a same field, the P time domain vectors fed back for each of the K spatial-frequency vector pairs, or may indicate, by using a same field, the P time domain coefficients fed back for each of the K spatial-frequency vector pairs. In other words, an indication field used to indicate the P time domain vectors is common to the K spatial-frequency vector pairs, and an indication field used to indicate the P time domain coefficients is also common to the K spatial-frequency vector pairs.

It should be understood that, the same field herein specifically means that indication fields of the time domain vectors are not repeated for the K spatial-frequency vector pairs, and indication fields of the time domain coefficients of the time domain vectors are not repeated for the K spatial-frequency vector pairs. A quantity of fields used to indicate the time domain vector and a quantity of fields used to indicate the time domain coefficient are not limited.

In another embodiment, the first indication information is used to indicate the P time domain vectors and K×P time domain coefficients. A weighted sum of every P time domain vectors may be used to approximately represent a change of a spatial-frequency coefficient of one spatial-frequency vector pair with time.

That is, the terminal device may jointly determine the P time domain vectors based on the K spatial-frequency vector pairs, and may determine the time domain coefficient of each time domain vector based on each of the K spatial-frequency vector pairs. Related descriptions about the K spatial-frequency vector pairs and the P time domain vectors jointly determined by the terminal device based on the K spatial-frequency vector pairs have been described in detail above. For brevity, details are not described herein again.

In this embodiment, the terminal device jointly determines the P time domain vectors based on the K spatial-frequency vector pairs, and may further determine the time domain coefficient of each time domain vector based on each of the K spatial-frequency vector pairs. Spatial-frequency coefficients corresponding to at least two spatial-frequency vector pairs are different. Therefore, when the network device constructs the precoding matrix based on the K' spatial-frequency vector pairs and the spatial-frequency coefficients corresponding to the K' spatial-frequency vector pairs below, spatial-frequency coefficients corresponding to at least two of the K spatial-frequency vector pairs are different.

Because the terminal device jointly determines the P time domain vectors based on the K spatial-frequency vector pairs, it may be considered that a quantity of time domain vectors corresponding to each spatial-frequency vector pair is P. In addition, the terminal device determines the P time domain vectors based on each of the K spatial-frequency vector pairs. Therefore, a total quantity of time domain vectors determined by the terminal device based on the K spatial-frequency vector pairs is K×P. In this case, a quantity of time domain coefficients corresponding to each spatial-frequency vector pair is P, but time domain coefficients corresponding to at least two spatial-frequency vector pairs are different.

It may be understood that, any two spatial-frequency vector pairs correspond to P same time domain vectors. Therefore, the terminal device may indicate the P time domain vectors by using the first indication information. In other words, the terminal device indicates the P time domain vectors only once. In other words, the terminal device may indicate, by using a same field, the P time domain vectors fed back for each of the K spatial-frequency vector pairs. In other words, an indication field used to indicate the P time domain vectors is common to the K spatial-frequency vector pairs.

It should be understood that, the same field herein specifically means that indication fields of the time domain vectors are not repeated for the K spatial-frequency vector pairs. A quantity of fields used to indicate the time domain vector is not limited.

In addition, when indicating the K×P time domain coefficients by using the first indication information, the terminal device may perform separate indication for each spatial-frequency vector. The time domain coefficient separately indicated for each spatial-frequency vector pair and the foregoing P time domain vectors may be used to determine the spatial-frequency coefficient of the spatial-frequency vector pair.

In still another embodiment, the first indication information may be used to indicate $$\sum_{k=1}^{K} P_k$$

time domain vectors and $$\sum_{k=1}^{K} P_k$$

time domain coefficients corresponding to the $$\sum_{k=1}^{K} P_k$$

time domain vectors. $1 \leq k \leq K$, $P_k \geq 1$, and k and $P_k$ are both integers.

That is, the terminal device may jointly determine one or more time domain vectors based on each of the K spatial-frequency vector pairs, and may determine, based on each of the K spatial-frequency vector pairs, a time domain coefficient corresponding to each time domain vector. Related descriptions about the K spatial-frequency vector pairs have been described in detail above. For brevity, details are not described herein again.

In this embodiment, the terminal device determines the one or more time domain vectors and the one or more time domain coefficients based on each spatial-frequency vector pair. Spatial-frequency coefficients corresponding to at least two spatial-frequency vector pairs are different. Therefore, when the network device constructs the precoding matrix based on the K' spatial-frequency vector pairs and the spatial-frequency coefficients of the K' spatial-frequency vector pairs below, spatial-frequency coefficients corresponding to at least two of the K spatial-frequency vector pairs are different.

When indicating, by using the first indication information, the foregoing $$\sum_{k=1}^{K} P_k$$

time domain vectors and the time domain coefficients corresponding to the $$\sum_{k=1}^{K} P_k$$

time domain vectors, the terminal device may perform separate indication for each spatial-frequency vector pair. The time domain vector and the time domain coefficient corresponding to the time domain vector that are indicated for each spatial-frequency vector pair may be used to determine the spatial-frequency coefficient of the spatial-frequency vector pair. For example, $P_k$ time domain vectors and time domain coefficient corresponding to the $P_k$ time domain vectors that are indicated for a $k^{th}$ spatial-frequency vector pair may be used to determine a spatial-frequency coefficient of the $k^{th}$ spatial-frequency vector pair.

For ease of distinguishing and description, herein, a vector obtained by performing weighted summation on one or more (for example, P or $P_k$) time domain vectors corresponding to one spatial-frequency vector pair is referred to as an estimation value of a spatial-frequency coefficient vector corresponding to the spatial-frequency vector pair. The spatial-frequency coefficient vector is described in detail below. Herein, detailed descriptions of the spatial-frequency coefficient vector are omitted.

For ease of understanding, the following first uses one spatial-frequency vector pair as an example to describe in detail a specific process in which the terminal device determines the P time domain vectors and the time domain coefficients corresponding to the P time domain vectors. One of the K spatial-frequency vector pairs is denoted as $(u_l, v_m)$. The spatial-frequency vector pair $(u_l, v_m)$ may be a strongest spatial-frequency vector pair in the K spatial-frequency vector pairs. l (where $1 \leq l \leq L$ and l is an integer) indicates that the spatial domain vector $u_l$ is an $l^{th}$ spatial domain vector in L (where L is an integer greater than or equal to 1) spatial domain vectors. m (where $1 \leq m \leq M$ and m is an integer) indicates that the frequency domain vector $v_m$ is an $m^{th}$ frequency domain vector in M (where M is an integer greater than or equal to 1) frequency domain vectors. The L spatial domain vectors and the M frequency domain vectors may be combined to obtain a plurality of spatial-frequency vector pairs (for example, K spatial-frequency vector pairs below). The plurality of spatial-frequency vector pairs may be used to construct a precoding matrix.

The strongest spatial-frequency vector pair herein may specifically mean that an amplitude of a spatial-frequency coefficient corresponding to the spatial-frequency vector pair is greater than or equal to an amplitude of a spatial-frequency coefficient corresponding to any spatial-frequency vector pair other than the spatial-frequency vector pair in the plurality of spatial-frequency vector pairs. The strongest spatial-frequency vector $(u_l, v_m)$ may be determined based on a reference signal received the first time, or may be determined based on a reference signal received any time in the N times, or may be determined after averaging of the reference signals received N times. This is not limited in this application.

N spatial-frequency coefficients that are determined based on the reference signals received N times and that correspond to the spatial-frequency vector pair $(u_l, v_m)$ are denoted as $a_1^{l,m}, a_2^{l,m}, \ldots,$ and $a_N^{l,m}$. An $n^{th}$ element in the N elements may be determined by performing channel measurement based on a reference signal received an $n^{th}$ time. A vector $c^{l,m} = [a_1^{l,m} \, a_2^{l,m} \ldots a_N^{l,m}]^T$ may be constructed by using the N spatial-frequency coefficients. The vector $c^{l,m}$ may reflect a change trend of N spatial-frequency matrices determined based on the reference signals received N times with time, that is, indirectly reflect a change trend of the channel with time. For ease of distinguishing and description, vectors constructed by using spatial-frequency coefficients corresponding to spatial-frequency vector pairs determined based on reference signals received a plurality of times are denoted as spatial-frequency coefficient vectors.

It should be understood that, merely for ease of understanding, the foregoing shows a spatial-frequency coefficient vector whose dimensions are N×1. However, this shall not constitute any limitation on this application. The spatial-frequency coefficient vector may alternatively be a vector whose dimensions are 1×N. A person skilled in the art may perform mathematical transformations or equivalent substitutions on the foregoing listed forms of the spatial-frequency coefficient vector based on a same concept, and all these mathematical transformations or equivalent substitutions shall fall within the protection scope of this application.

It should be further understood that, merely for ease of understanding, the foregoing shows a spatial-frequency coefficient vector whose length is N. However, this shall not constitute any limitation on this application. A dimension of the spatial-frequency coefficient vector may be the same as or different from the quantity N of times that the terminal device receives the reference signals. For example, the length of the spatial-frequency coefficient vector may be greater than N. The terminal device may generate a spatial-frequency coefficient vector with a larger length, for example, 2N through interpolation. For another example, the length of the spatial-frequency coefficient vector may be less than N. The terminal device may extract some spatial-frequency coefficients from the N spatial-frequency coefficients determined based on the reference signals received N times, to construct a spatial-frequency coefficient vector with a smaller dimension. For still another example, the dimension of the spatial-frequency coefficient vector may be less than N. The terminal device may determine a spatial-frequency matrix based on reference signals received a plurality of times, and further determine a spatial-frequency coefficient corresponding to the spatial-frequency matrix. Therefore, a quantity of determined spatial-frequency coefficients is less than N, and a length of the spatial-frequency coefficient vector is also less than N.

For ease of description, it is assumed below that the length of the spatial-frequency coefficient vector is N.

When the length of the spatial-frequency coefficient vector is N, N elements in the spatial-frequency coefficient vector correspond to N measurement moments, and may be used to indicate a spatial-frequency coefficient of the spatial-frequency vector pair at each of the N measurement moments. In other words, an $n^{th}$ element in the N elements in the time domain coefficient vector may be used to determine a spatial-frequency matrix at an $n^{th}$ measurement moment.

As described above, the spatial-frequency coefficient vector may be represented by using the weighted sum of the one or more time domain vectors. In this embodiment of this application, the terminal device may determine one or more time domain vectors from a predefined codebook, to approximately represent the spatial-frequency coefficient vector. The codebook used to determine the one or more time domain vectors may be indicated by the network device to the terminal device by using signaling, for example, an index of the codebook is indicated, or an index of the codebook and an oversampling factor are indicated. Alternatively, the terminal device may determine the codebook and report the used codebook when reporting the first indication information, for example, report an index of the used codebook or an index of the codebook and an oversampling factor. Alternatively, the codebook may be predefined, for example, defined in a protocol. This is not limited in this application.

In an implementation, for example, the terminal device may project the spatial-frequency coefficient vector to the codebook, to select P stronger time domain vectors, to approximately represent the spatial-frequency coefficient vector.

It should be noted that a dimension of the codebook used to determine the time domain vector corresponds to a dimension of the spatial-frequency coefficient vector. For example, if the length of the spatial-frequency coefficient vector is N, the dimension of the codebook used to determine the time domain vector may also be N. The dimension of the spatial-frequency coefficient vector is related to the quantity of times of receiving the reference signals. Therefore, the dimension of the codebook is related to the quantity N of times of receiving the reference signals. Optionally, the dimension of the codebook is the same as the quantity N of times of receiving the reference signals. The terminal device may generate, based on the reference signals received N times, the spatial-frequency coefficient vector whose length is N. Optionally, the dimension of the codebook is the same as the length of the spatial-frequency coefficient vector. The terminal device may select, by using the N-dimensional codebook, the P time domain vectors that may be used to approximately represent the spatial-frequency coefficient vector. It may be understood that, the dimension N of the codebook used to determine the time domain vector is greater than or equal to the quantity P of selected time domain vectors. That is, N≥P. Optionally, the dimension of the codebook may be an oversampling multiple of the spatial-frequency coefficient vector. For example, if the length of the spatial-frequency coefficient vector is N and the oversampling factor is $O_t$, dimensions of the codebook used to determine the time domain vector may be N×($O_t$×N). It may be understood that, the dimensions $O_t$×N of the codebook used to determine the time domain vector are greater than or equal to the quantity P of selected time domain vectors. That is, $O_t$×N≥P.

It should be further noted that the length of the spatial-frequency coefficient vector may be pre-agreed on by the network device and the terminal device. For example, the two parties may agree that the quantity N of times of receiving the reference signals is denoted as the length of the spatial-frequency coefficient vector, or the length, for example, 2N, of the spatial-frequency coefficient vector may be determined based on N. This is not limited in this application. In a possible implementation, the network device may indicate, to the terminal device in advance, the codebook used to determine the time domain vector, and implicitly indicate the length of the spatial-frequency coefficient vector by indicating the codebook. For example, when the codebook indicated by the network device to the terminal device in advance is an N-dimensional codebook, the length of the spatial-frequency coefficient vector that is N is implicitly indicated. Certainly, the network device may alternatively indicate the length of the spatial-frequency coefficient vector to the terminal device by using other signaling. For brevity, examples are not described one by one herein.

In this embodiment, the length of the spatial-frequency coefficient vector is N. In this case, the codebook used to determine the time domain vector is an N-dimensional codebook, and the N-dimensional codebook includes N time domain vectors whose lengths are N. A matrix whose dimensions are N×N may be constructed by using the N time domain vectors whose lengths are N. For example, the matrix is denoted as $U_t$. For example, $U_t = [d_1 \ d_2 \ \ldots \ d_N]$ $d_1$, $d_2, \ldots,$ and $d_N$ are the N time domain vectors whose lengths are N in the codebook. Projection of the spatial-frequency coefficient vector to the predefined codebook may be expressed, according to a calculation formula, as $U_t^H c^{l,m}$. A vector $d^{l,m}$ whose dimensions are N×1 may be obtained through projection, and $d_{l,m} = [b_1^{l,m} \ b_2^{l,m} \ \ldots \ b_N^{l,m}]^T$. N elements in the vector $d^{l,m}$ may indicate a weight of each of the N time domain vectors in the matrix $U_t$. For example, an $n^{th}$ element $b_n^{l,m}$ in the vector $d^{l,m}$ indicates a weight of an $n^{th}$ time domain vector $d_n$ in the matrix $U_t$. It may be understood that, the weight may also be referred to as a time domain coefficient.

The terminal device may select P stronger elements from the vector $d^{l,m}$, and positions of the P stronger elements in the vector $d^{l,m}$ correspond to positions of P time domain vectors in the matrix $U_t$. For example, the terminal device may determine the P stronger elements based on values of squares of moduli of the N elements in the vector $d^{l,m}$ that are obtained through projection. A square of a modulus of any one of the P selected elements is greater than or equal to a square of a modulus of any one of N—P unselected elements. The P time domain vectors may be determined by using the P stronger elements. For example, the corresponding positions of the P stronger elements in the vector $d^{l,m}$ may be the positions of the P selected time domain vectors in the matrix $U_t$.

For example, P=3, and three stronger elements in the N elements are denoted as $b_{p_1}^{l,m}$, $b_{p_2}^{l,m}$, and $b_{p_3}^{l,m}$. Subscripts $p_1$, $p_2$, and $p_3$ respectively represent indexes of the elements in the vector $d^{l,m}$. For example, if $p_1=1$, $p_2=4$, and $p_3=8$, it indicates that the first element $b_1^{l,m}$, the fourth element $b_4^{l,m}$, and the eighth element $b_8^{l,m}$ in the vector $d^{l,m}$ are the three stronger elements. Correspondingly, the first vector $d_1$, the fourth vector $d_4$, and the eighth vector $d_8$ in the matrix $U_t$ are three stronger time domain vectors.

It should be understood that, $P=_3$ and the indexes of the P stronger elements are merely examples for ease of understanding, and this shall not constitute any limitation on this application. Neither of a value of P and the indexes of the P elements is limited in this application.

Merely for ease of understanding, the foregoing uses a spatial-frequency coefficient vector corresponding to one spatial-frequency vector pair as an example to describe in detail a specific process in which the terminal device determines the P time domain vectors and the time domain coefficients corresponding to the P time domain vectors. However, this shall not constitute any limitation on this application. The terminal device may alternatively determine, based on spatial-frequency coefficients corresponding to a plurality of spatial-frequency vector pairs, the P time domain vectors and the time domain coefficients corresponding to the P time domain vectors.

Optionally, the terminal device determines, based on K spatial-frequency coefficient vectors corresponding to the K spatial-frequency vector pairs, the P time domain vectors and the time domain coefficients corresponding to the P time domain vectors.

As described above, when the terminal device determines, based on the plurality of spatial-frequency vector pairs, the time domain vectors and the time domain coefficients, the plurality of spatial-frequency vector pairs correspond to P same time domain vectors and P same time domain coefficients, or the plurality of spatial-frequency vector pairs correspond to P same time domain vectors, and each spatial-frequency vector pair corresponds to P time domain coefficients, or the plurality of spatial-frequency vector pairs each correspond to one or more time domain vectors and one or more time domain coefficients.

In a possible case, the plurality of spatial-frequency vector pairs correspond to the P same time domain vectors and the P same time domain coefficients. The terminal device may determine, based on one (for example, a strongest spatial-frequency vector pair) of the plurality of spatial-frequency vector pairs or a weighted average of the plurality of spatial-frequency vector pairs, the P same time domain vectors and the P same time domain coefficients.

In another possible case, the plurality of spatial-frequency vector pairs each may correspond to the one or more time domain vectors and the one or more time domain coefficients. The terminal device may determine, based on a change of the spatial-frequency coefficient corresponding to each of the plurality of spatial-frequency vector pairs with time, the spatial-frequency coefficient vector corresponding to each spatial-frequency vector pair. The terminal device may project the spatial-frequency coefficient vector corresponding to each spatial-frequency vector pair to the codebook, to determine the one or more time domain vectors corresponding to each spatial-frequency vector pair and the time domain coefficient corresponding to each time domain vector.

It is assumed that the terminal device determines the K corresponding spatial-frequency coefficient vectors based on the K spatial-frequency vector pairs. Each of the K spatial-frequency coefficient vectors may be used to determine one or more time domain vectors. For example, a $k^{th}$ spatial-frequency coefficient vector in the K spatial-frequency coefficient vectors may be used to determine $P_k$ time domain vectors and time domain coefficients corresponding to the $P_k$ time domain vectors, $P_k<P$, and $P_k$ is a positive integer. Briefly, the $P_k$ time domain vectors and the time domain coefficients corresponding to the $P_k$ time domain vectors are time domain vectors and time domain coefficients corresponding to the $k^{th}$ spatial-frequency vector pair. The $P_k$ time domain vectors and the time domain coefficients corresponding to the $P_k$ time domain vectors may be used to determine an estimation value of a spatial-frequency coefficient vector corresponding to the $k^{th}$ spatial-frequency vector pair.

The terminal device may sequentially determine, in the foregoing manner of projecting one spatial-frequency coefficient vector to the codebook, time domain vectors and time domain coefficients corresponding to the first spatial-frequency vector pair to a $K^{th}$ spatial-frequency vector pair. In this case, the terminal device may sequentially project the spatial-frequency coefficient vectors corresponding to the K spatial-frequency vector pairs to the codebook, to determine the time domain vectors and the time domain coefficients.

The terminal device may alternatively construct a matrix by using the spatial-frequency coefficient vectors corresponding to the K spatial-frequency vector pairs. For example, the matrix may be a matrix whose dimensions are N×K. Each column vector in the matrix corresponds to one spatial-frequency vector pair. Each column vector in the matrix obtained through projection also corresponds to one spatial-frequency vector pair. The terminal device may determine, based on an element in each column vector, one or more stronger elements in each column as a time domain coefficient. One or more time domain vectors corresponding to each spatial-frequency vector pair may be determined based on a position of the one or more elements in the column vector.

It should be understood that, a method for determining, by the terminal device based on the K spatial-frequency vector pairs, the corresponding time domain vectors and the time domain coefficients corresponding to the time domain vectors is not limited to the foregoing listed example. For brevity, examples are not described one by one herein.

The terminal device may determine a total of $$\sum_{k=1}^{K} P_k$$

time domain vectors based on the K spatial-frequency coefficient vectors corresponding to the K spatial-frequency vector pairs. It may be understood that, some of the P time domain vectors determined based on the K spatial-frequency coefficient vectors may be the same or repeated. In other words, the P time domain vectors may be different from each other, or may be partially repeated. However, because these repeated time domain vectors are determined based on different spatial-frequency coefficient vectors, corresponding time domain coefficients are not necessarily the same.

In addition, quantities of time domain vectors determined based on a plurality of spatial-frequency vector pairs may be the same or different. This is not limited in this application. A quantity of time domain vectors determined based on each spatial-frequency vector pair may be indicated by the network device, or may be determined by the terminal device, or may be predefined. This is not limited in this application.

In a possible design, the terminal device may determine a larger quantity of time domain vectors for the strongest spatial-frequency vector pair, and determine a smaller quantity of time domain vectors for another spatial-frequency vector pair.

In another possible design, the terminal device may group the K spatial-frequency vector pairs into a plurality of groups, and determine different quantities of time domain vectors for spatial-frequency vector pairs in different groups. For example, the terminal device may group the K spatial-frequency vector pairs into two groups: a group 1 and a group 2. The group 1 includes one or more stronger spatial-frequency vector pairs in the K spatial-frequency vector pairs, and the group 2 includes one or more remaining spatial-frequency vector pairs. Alternatively, when a transmit antenna has a plurality of polarization directions, the group 1 and the group 2 each may include one or more spatial-frequency vector pairs corresponding to a different polarization direction. The spatial-frequency vector pair in each group may be used to determine a same quantity of time domain vectors, and a quantity of time domain vectors determined based on the spatial-frequency vector pair in the group 1 may be greater than a quantity of time domain vectors determined based on the spatial-frequency vector pair in the group 2. For example, a quantity of spatial-frequency vector pairs included in the group 1 and a quantity of spatial-frequency vector pairs included in the group 2 may be predefined, or may be pre-agreed on by the network device and the terminal device, or may be determined according to a predefined rule. For brevity, examples are not described one by one herein.

It should be understood that, the foregoing listed manner of determining the quantities of time domain vectors determined for different spatial-frequency vector pairs is merely an example, and this shall not constitute any limitation on this application.

In addition, the codebook used to determine the time domain vector may be determined from a plurality of predefined codebooks. There may be one or more codebooks used to determine the P time domain vectors. This is not limited in this application.

In an embodiment, the terminal device may determine, based on a plurality of codebooks with different dimensions, the P time domain vectors and the time domain coefficients corresponding to the P time domain vectors. Specifically, the terminal device may determine the corresponding time domain vectors and time domain coefficients based on the K spatial-frequency vector pairs. When at least two spatial-frequency vector pairs are used to determine the time domain vectors, determining may be performed based on two codebooks with different dimensions. For example, strength of a spatial-frequency vector pair 1 is higher than strength of a spatial-frequency vector pair 2. The terminal device may determine one or more time domain vectors based on the spatial-frequency vector pair 1 and a codebook whose dimensions are α×N, and determine one or more time domain vectors by using the spatial-frequency vector pair 2 and a codebook whose dimension is N, where α is an integer greater than 1. Alternatively, the terminal device may determine one or more time domain vectors based on the spatial-frequency vector pair 1 and a codebook whose dimension is N, and determine one or more time domain vectors based on the spatial-frequency vector pair 2 and a codebook whose dimension is $\lceil N/\beta \rceil$, $\lfloor N/\beta \rfloor$, or $[N/\beta]$, where β is an integer greater than 1. For brevity, details are not described herein again. $\lceil \ \rceil$ indicates rounding up, $\lfloor \ \rfloor$ indicates rounding down, and $[\ ]$ indicates rounding off.

In the foregoing embodiment, for example, that strength of a spatial-frequency vector pair 1 is higher than strength of a spatial-frequency vector pair 2 may be determined by comparing amplitudes, at a same measurement moment, of a spatial-frequency coefficient corresponding to the spatial-frequency vector pair 1 and a spatial-frequency coefficient corresponding to the spatial-frequency vector pair 2. This is not limited in this application.

It can be learned from the foregoing example that the terminal device may determine the time domain vectors by using codebooks with different precision for spatial-frequency vector pairs with different strength. For example, for a stronger spatial-frequency vector pair, a codebook with higher precision may be used to determine a time domain vector, and a representation form is that a codebook with a larger dimension is used to determine the time domain vector. For a weaker spatial-frequency vector pair, a codebook with lower precision may be used to determine a time domain vector, and a representation form is that a codebook with a smaller dimension is used to determine the time domain vector.

It should be understood that, the embodiment shown above is merely an example, and this shall not constitute any limitation on this application. The terminal device may alternatively determine, based on more codebooks with different dimensions and the K spatial-frequency vector pairs, one or more time domain vectors and a time domain coefficient corresponding to the one or more time domain vectors. This is not limited in this application.

In still another case, the plurality of spatial-frequency vector pairs correspond to the P same time domain vectors, but each spatial-frequency vector pair corresponds to P time domain coefficients. The terminal device may determine P stronger time domain vectors based on one spatial-frequency vector pair (for example, a strongest spatial-frequency vector pair), or may determine P stronger time domain vectors based on the plurality of spatial-frequency vector pairs.

A specific process in which the terminal device determines the P time domain vectors based on one spatial-frequency vector pair has been described in detail above. For brevity, details are not described herein again. After determining the P time domain vectors, the terminal device may further determine, based on the spatial-frequency coefficient vectors corresponding to the plurality of spatial-frequency vector pairs, the P time domain coefficients corresponding to each spatial-frequency vector pair.

If the plurality of spatial-frequency vector pairs corresponds to the P same time domain vectors, and the plurality of spatial-frequency vector pairs each correspond to the P time domain coefficients, the terminal device may determine P stronger time domain vectors based on one or more spatial-frequency vector pairs.

A specific process in which the terminal device determines the P stronger time domain vectors based on one spatial-frequency vector pair has been described in detail above. For brevity, details are not described herein again.

The terminal device alternatively determines the P stronger time domain vectors based on the plurality of spatial-frequency vector pairs. Specifically, the terminal device may project the spatial-frequency coefficient vectors corresponding to the plurality of spatial-frequency vector pairs to a codebook, to obtain a plurality of vectors. The terminal device may select P stronger elements based on the plurality of vectors, and determine, based on positions of the P stronger elements in the vector, P time domain vectors at same positions from the codebook. Therefore, P determined time domain vectors may be the P same time domain vectors of the plurality of spatial-frequency vector pairs.

For example, the terminal device may sequentially determine, in the foregoing manner of projecting one spatial-frequency coefficient vector to the codebook, the time domain coefficients corresponding to the first spatial-frequency vector pair to the $K^{th}$ spatial-frequency vector pair. Using the $k^{th}$ spatial-frequency vector pair as an example, from vectors that may be obtained by projecting the spatial-frequency coefficient vector corresponding to the $k^{th}$ spatial-frequency vector pair to the codebook, P elements corresponding to positions of the P time domain vectors in the matrix $U_t$ are selected as P time domain coefficients corresponding to the P time domain vectors.

The terminal device may alternatively construct a matrix by using the K spatial-frequency coefficient vectors corresponding to the K spatial-frequency vector pairs. For example, the matrix may be a matrix whose dimensions are N×K. Each column vector in the matrix corresponds to one spatial-frequency vector pair. Each column vector in the matrix obtained through projection also corresponds to one spatial-frequency vector pair. The terminal device may select, based on the positions of the P time domain vectors in the matrix $U_t$, elements at corresponding positions in each column vector, as the P time domain coefficients corresponding to the P time domain vectors. Therefore, the P time domain coefficients corresponding to each spatial-frequency vector pair may be determined.

In addition to the foregoing listed method, the terminal device may further determine, in another possible manner, the P time domain vectors and the time domain coefficients corresponding to the P time domain vectors. For example, the terminal device may determine, based on a combination of the foregoing two methods, the P time domain vectors and the time domain coefficients corresponding to the P time domain vectors. Alternatively, the terminal device may select, from the matrix whose dimensions are N×K, P rows with higher total energy or higher average energy, and positions of the P rows in the matrix whose dimensions are N×K correspond to the positions of the P time domain vectors in the matrix $U_t$.

Specifically, the terminal device may group the K spatial-frequency vector pairs into a plurality of groups, and each group may include one or more spatial-frequency vector pairs. The terminal device may determine one or more same time domain vectors and one or more same time domain coefficients based on the spatial-frequency vector pair in each group. That is, spatial-frequency vector pairs in a group may share one or more same time domain vectors and one or more same time domain coefficients. The terminal device may alternatively determine one or more same time domain vectors based on the spatial-frequency vector pair in each group, and determine one or more time domain coefficients based on each spatial-frequency vector pair. That is, spatial-frequency vector pairs in a group may share one or more same time domain vectors, but time domain coefficients corresponding to the spatial-frequency vector pairs in the group are different. In addition, time domain vectors corresponding to spatial-frequency vector pairs in different groups are different, and delay coefficients corresponding to the spatial-frequency vector pairs in the different groups are also different. The term "different" described herein may be partially different, or may be completely different. This is not limited in this application.

When determining the one or more same time domain vectors and the one or more same time domain coefficients based on the spatial-frequency vector pair in the group, the terminal device may perform determining based on a specific spatial-frequency vector pair in the group, for example, a strongest spatial-frequency vector pair in the group, or may perform determining based on a weighted average of a plurality of spatial-frequency vector pairs in the group. For brevity, examples are not described one by one herein.

It should be understood that, the foregoing method for determining the P time domain vectors and the time domain coefficients corresponding to the P time domain vectors is merely an example, and this shall not constitute any limitation on this application. For example, the terminal device may alternatively determine, by using an existing estimation algorithm, such as a multiple signal classification algorithm (MUSIC), a Bartlett algorithm, or an estimation of signal parameters via rotation invariant technique algorithm (ESPRIT), the time domain vectors and the time domain coefficients corresponding to the time domain vectors. For brevity, examples are not described herein. In addition, a sequence of determining the time domain vectors and the time domain coefficients corresponding to the time domain vectors is not limited in this application.

After determining the P time domain vectors and the time domain coefficients corresponding to the P time domain vectors, the terminal device may generate the first indication information, to indicate the P time domain vectors and the time domain coefficients corresponding to the P time domain vectors.

The P time domain vectors are selected from the codebook. Therefore, in an implementation, when indicating the P time domain vectors by using the first indication information, the terminal device may perform indication by indicating indexes of the P time domain vectors in the codebook.

In an embodiment, the P time domain vectors are determined based on a same codebook. The codebook may be indicated by the network device or predefined in a protocol. When the first indication information is used to indicate the P time domain vectors, the first indication information may include indexes of the P time domain vectors in the codebook or an index of a combination of the P time domain vectors.

For example, in the foregoing embodiment, if the three (P=3) time domain vectors selected by the terminal device are the first time domain vector, the fourth time domain vector, and the eighth time domain vector in the N time domain vectors, the terminal device may indicate index values 1, 4, and 8 by using the first indication information.

In another embodiment, the P time domain vectors are determined based on a same codebook. The codebook may be determined by the terminal device. When the first indication information is used to indicate the P time domain vectors, the first indication information may indicate the codebook and indexes of the P time domain vectors in the codebook or an index of a combination of the P time domain vectors.

In still another embodiment, the P time domain vectors are determined based on different codebooks. When the first indication information is used to indicate the P time domain vectors, the first indication information may indicate a codebook used to determine each time domain vector and an index of each time domain vector in the corresponding codebook.

In another implementation, each time domain vector may correspond to one Doppler shift. In other words, the component feature of the foregoing time-varying feature may be a Doppler shift. When the plurality of time domain vectors are obtained from an N-dimensional codebook, it may be understood that a maximum Doppler shift is equally divided into N parts, and N time domain vectors in the N-dimensional codebook correspond to N Doppler shifts. In an implementation, a ratio of a Doppler shift corresponding to an $n^{th}$ time domain vector to the maximum Doppler shift is n/N.

The maximum Doppler shift may be determined by the network device, for example, determined based on uplink-downlink reciprocity, or determined based on a moving speed of the terminal device and/or a position of the terminal device relative to the base station, and the terminal device is indicated to perform channel measurement and provide a feedback by using a codebook corresponding to the maximum Doppler shift. Alternatively, the maximum Doppler shift may be determined by the terminal device and reported to the network device. Alternatively, the maximum Doppler shift may be predefined, for example, defined in a protocol, or bound to a reference signal configuration, or the like.

Therefore, when the terminal device indicates P Doppler shifts by using the first indication information, it is considered that the terminal device indicates the P selected time domain vectors by using the first indication information. In other words, the two indication manners are equivalent.

It should be understood that, the foregoing is merely an example, and shows several possible implementations in which the terminal device indicates the P time domain vectors. However, this shall not constitute any limitation on this application.

In addition, if the K spatial-frequency vector pairs do not correspond to the P same time domain vectors, when indicating the P time domain vectors, the terminal device may perform indication in a pre-agreed sequence. For example, one or more corresponding time domain vectors are sequentially indicated in an indication sequence of the K spatial-frequency vector pairs. For another example, one or more corresponding time domain vectors are sequentially indicated in a strength sequence of the K spatial-frequency vector pairs. A specific sequence and method in which the terminal device indicates the P time domain vectors are not limited in this application.

When indicating, by using the first indication information, the P time domain coefficients corresponding to the P time domain vectors, the terminal device may perform indication by using quantized values of the P time domain coefficients, or may perform indication by using quantized value indexes, or may perform indication in another manner. A manner of indicating the time domain coefficients is not limited in this application, provided that the network device can determine the P time domain coefficients based on the first indication information. In this embodiment of this application, for ease of description, information used to indicate the time domain coefficient is referred to as quantization information of the time domain coefficient. The quantization information may be, for example, a quantized value, an index, or any other information that may be used to indicate the time domain coefficient.

In an implementation, the terminal device may indicate the P time domain coefficients in a normalized manner. For example, the terminal device may determine, from the P time domain coefficients, a time domain coefficient with a largest modulus (for example, denoted as a maximum time domain coefficient), and indicate a position of the maximum time domain coefficient in the P time domain vectors corresponding to the P time domain coefficients. The terminal device may further indicate relative values of P−1 remaining time domain coefficients relative to the maximum time domain coefficient. The terminal device may indicate the P−1 time domain coefficients by using quantized value indexes of the relative values. For example, the network device and the terminal device may predefine a one-to-one correspondence between a plurality of quantized values and a plurality of indexes, and the terminal device may feed back the relative values of the time domain coefficients relative to the maximum time domain coefficient to the network device based on the one-to-one correspondence. Because the terminal device quantizes the time domain coefficients, and a quantized value may be the same as or close to an actual value, the quantized value is referred to as a quantized value of the time domain coefficient.

It should be understood that, the foregoing listed manner of indicating each time domain coefficient in the normalized manner is merely a possible implementation, and this shall not constitute any limitation on this application. A specific manner in which the terminal device indicates the time domain coefficient is not limited in this application.

It should be further understood that, when the first indication information is used to indicate the P time domain coefficients, a direct or indirect manner may be used for indication. For example, for the maximum time domain coefficient, the position of the maximum time domain coefficient in the P time domain coefficients may be indicated. For another example, for a time domain coefficient whose quantized value is zero, a position of the time domain coefficient in the P time domain coefficients may also be indicated. In other words, the first indication information does not necessarily indicate each of the P time domain coefficients, provided that the network device can restore the P time domain coefficients based on the first indication information.

Operation 330: The terminal device sends the first indication information. Correspondingly, the network device receives the first indication information.

For example, the terminal device may send the first indication information to the network device by using a physical uplink resource, for example, a physical uplink shared channel (PUSCH) or a physical uplink control channel (PUCCH). For example, the first indication information may be carried in a channel state information (CSI) report, or may be carried in other signaling. This is not limited in this application.

A specific method for sending the indication information by the terminal device to the network device by using the physical uplink resource may be the same as that in the conventional technology. For brevity, detailed descriptions of the specific process are omitted herein.

As described above, the P time domain vectors and the time domain coefficients corresponding to the P time domain vectors are used by the network device to restore a downlink channel. When the terminal device determines, based on the feedback manner for dual-domain compression, a change rule of the spatial-frequency coefficient corresponding to the spatial-frequency vector pair with time, the terminal device may further report, to the network device, the spatial-frequency vector pair used to determine the time domain vector and the time domain coefficient corresponding to the time domain vector.

The spatial-frequency vector pair indicated by the terminal device to the network device may be the K spatial-frequency vector pairs, or may include the K spatial-frequency vector pairs. This is not limited in this application.

If the spatial-frequency vector pair indicated by the terminal device to the network device based on the feedback manner for dual-domain compression includes one or more spatial-frequency vector pairs other than the K spatial-frequency vector pairs, for example, the terminal device feeds back K' spatial-frequency vector pairs based on the feedback manner for dual-domain compression, where K'>K, and K' is an integer, the network device and the terminal device may select, according to a preset rule, K spatial-frequency vector pairs from the K' spatial-frequency vector pairs, to determine the P time domain vectors and the time domain coefficients corresponding to the P time domain vectors. For example, a value of K may be determined by the network device. The K spatial-frequency vector pairs may be K stronger spatial-frequency vector pairs in the K' spatial-frequency vector pairs, and an amplitude of a spatial-frequency coefficient corresponding to any one of K'–K unselected spatial-frequency vector pairs in the K' spatial-frequency vector pairs is less than or equal to an amplitude of a spatial-frequency coefficient corresponding to any one of the K spatial-frequency vector pairs. For another example, a value of K may be determined by the terminal device. The K spatial-frequency vector pairs may be spatial-frequency vector pairs whose amplitudes are greater than or equal to a preset threshold in the K' spatial-frequency vector pairs.

It should be understood that, the foregoing listed preset rule used to determine the K spatial-frequency vector pairs is merely an example, and this shall not constitute any limitation on this application. A specific relationship between the K spatial-frequency vector pairs and the K' spatial-frequency vector pairs is not limited in this application.

Certainly, the terminal device may alternatively report the K spatial-frequency vector pairs to the network device in another manner. Optionally, the method further includes the terminal device sends fifth indication information, where the fifth indication information is used to indicate the K spatial-frequency vector pairs. Correspondingly, the network device receives the fifth indication information, where the fifth indication information is used to indicate the K spatial-frequency vector pairs. It should be understood that, the K spatial-frequency vector pairs are spatial-frequency vector pairs used to determine the one or more time domain vectors and the time domain coefficient corresponding to the one or more time domain vectors.

It should be further understood that, the fifth indication information and the foregoing first indication information may be carried in same signaling, for example, a CSI report, or may be carried in different signaling, for example, existing or newly added signaling. This is not limited in this application.

When the fifth indication information and the first indication information are carried in the same signaling, the operation of sending the fifth indication information and operation 330 may be combined into a same operation. In other words, the terminal device may send the first indication information and the fifth indication information to the network device by sending the same signaling. When the fifth indication information and the first indication information are carried in the different signaling, the operation of sending the fifth indication information and operation 330 may be different operations.

As described above, the reference signal sent by the network device may be a non-precoded reference signal, or may be a precoded reference signal. Based on different reference signals sent by the network device, processing manners of the terminal device are also slightly different.

Optionally, the fifth indication information specifically indicates the K spatial-frequency vector pairs.

If the reference signal sent by the network device is a non-precoded reference signal, the terminal device may first determine the K' spatial-frequency vector pairs based on the received reference signal, where a weighted sum of the K' spatial-frequency vector pairs may be used to construct a spatial-frequency matrix. The terminal device may select the K spatial-frequency vector pairs from the K' spatial-frequency vector pairs, where the K spatial-frequency vector pairs may be some or all of the K' spatial-frequency vector pairs determined by the terminal device. The terminal device may measure and record, at a plurality of measurement moments, spatial-frequency coefficients corresponding to the K selected spatial-frequency vector pairs, to obtain the K spatial-frequency coefficient vectors and further determine the P time domain vectors and the time domain coefficients corresponding to the P time domain vectors.

For example, indication of the K spatial-frequency vector pairs by the fifth indication information may include indexes of spatial domain vectors used for combination to obtain the K spatial-frequency vector pairs in a spatial domain vector set and indexes of frequency domain vectors used for combination to obtain the K spatial-frequency vector pairs in a frequency domain vector set. For example, indication of the K spatial-frequency vector pairs by the fifth indication information may alternatively include an index of a combination of a plurality of spatial domain vectors used for combination to obtain the K spatial-frequency vector pairs in a spatial domain vector set and an index of a combination of a plurality of frequency domain vectors used for combination to obtain the K spatial-frequency vector pairs in a frequency domain vector set.

It should be understood that, for a specific method for indicating the K spatial-frequency vector pairs by the terminal device, refer to a method for indicating a spatial-frequency vector pair in the feedback manner for dual-domain compression in the conventional technology. The specific method for indicating the K spatial-frequency vector pairs by the terminal device is not limited in this application.

Optionally, the fifth indication information specifically indicates ports corresponding to the K spatial-frequency vector pairs.

If the reference signal sent by the network device is a precoded reference signal, for example, the precoded reference signal may be obtained by precoding a reference signal based on a spatial domain vector and a frequency domain vector, or may be obtained by precoding a reference signal based on an angle vector and a delay vector, the precoded reference signal may correspond to K' ports, the K' ports may be in a one-to-one correspondence with the K' spatial-frequency vector pairs, or may be in a one-to-one correspondence with K' angle-delay pairs. The terminal device may determine, based on received precoded reference signals of the K' ports, a spatial-frequency coefficient corresponding to each port, and select K ports from the K' ports based on the spatial-frequency coefficient corresponding to each port. The terminal device may measure and record, at a plurality of measurement moments, spatial-frequency coefficients corresponding to the K ports, to obtain the K spatial-frequency coefficient vectors and further determine the P time domain vectors and the time domain coefficients corresponding to the P time domain vectors.

It should be understood that, for example, indication of the K ports by the fifth indication information may include port numbers of the K ports. A specific method for indicating the K ports by the terminal device is not limited in this application.

Operation 340: The network device determines, based on the first indication information, the one or more component features and the weighting coefficient of each component feature.

After receiving the first indication information, the network device may determine, based on the first indication information, the P time domain vectors and the time domain coefficients corresponding to the P time domain vectors. A process in which the network device interprets the first indication information corresponds to a process in which the terminal device generates the first indication information. The terminal device may generate the first indication information in a manner that may be pre-agreed on by the two parties or in a predefined manner, and the network device may interpret the first indication information in a same manner.

A specific process in which the terminal device generates the first indication information has been described in detail in operation 310 above, and a specific process in which the network device determines, based on the first indication information, the P time domain vectors and the time domain coefficients corresponding to the P time domain vectors corresponds to the process. For brevity, details are not described herein again.

Based on the foregoing solution, the terminal device may approximately represent the time-varying feature of the channel by using the weighted sum of the one or more component features, and feed back quantization information of the component feature and the weighting coefficient to the network device. In this way, the network device can determine a change of the channel in time domain, and can more fully learn of a channel state, to make a more proper decision for downlink scheduling.

In a possible example, the network device may determine, based on the time-varying feature fed back by the terminal device, a precoding matrix used for downlink transmission.

Optionally, the method further includes Operation 350: The network device determines a precoding matrix based on the one or more component features and the weighting coefficient of each component feature.

After determining the P time domain vectors and the time domain coefficients corresponding to the P time domain vectors, the network device may restore the spatial-frequency coefficient vectors of the K spatial-frequency vector pairs, that is, may determine spatial-frequency coefficients corresponding to the K spatial-frequency vector pairs at N measurement moments. It may be understood that, the spatial-frequency coefficient vectors restored by the network device based on the P time domain vectors and the time domain coefficients corresponding to the P time domain vectors are the foregoing estimation values of the spatial-frequency coefficient vectors. As described above, the spatial-frequency coefficient vectors may be approximately restored by using the weighted sum of the P time domain vectors.

If the P time domain vectors and the time domain coefficients corresponding to the P time domain vectors are determined by using a spatial-frequency coefficient vector corresponding to one spatial-frequency vector pair, that is, K=1, the estimation value of the spatial-frequency coefficient vector is restored by using the weighted sum of the P time domain vectors.

Using the spatial-frequency vector pair $(u_l, v_m)$ in operation 310 as an example, the weighted sum of the P time domain vectors is $$\sum_{i=1}^{P} b_{p_i}^{l,m} d_{p_i}^{l,m}.$$

That is, $$\tilde{c}^{l,m} = \sum_{i=1}^{P} b_{p_i}^{l,m} d_{p_i}^{l,m}.$$

Alternatively, the weighted sum of the P time domain vectors may be represented by a matrix operation. For example, $\tilde{c}^{l,m}=U_t \overline{d}^{l,m}$, $\tilde{c}^{l,m}=\overline{U}_t d^{l,m}$, or another equivalent mathematical transformation. This is not limited in this application. $\tilde{c}^{l,m}$ indicates an estimation value of $c^{l,m}$, and is distinguished from a spatial-frequency coefficient vector $c^{l,m}$ determined by the terminal device through actual measurement. $b_{p_i}^{l,m}$ indicates time domain coefficients determined by using the foregoing P indexes (for example, $p_1$, $p_2$, and $p_3$) and the vector $d^{l,m}$. $d_{p_i}^{l,m}$ indicates vectors determined by using the foregoing P indexes and the matrix $U_t$, and i=1, 2, . . . , or P. $\overline{d}^{l,m}$ may be vectors determined by using the foregoing P indexes and the vector $d^{l,m}$. $\overline{U}_t$ may be a matrix determined by using the foregoing P indexes and the matrix $U_t$. Assuming that P=3,
$\overline{d}^{l,m}=[0 \ldots 0\ b_{p_1}^{u,v}\ 0 \ldots 0\ b_{p_2}^{l,m}\ 0 \ldots 0\ b_{p_3}^{l,m}\ 0 \ldots 0]^T_{N \times 1}$
and
$\overline{U}_t=[0 \ldots 0\ d_{p_1}\ 0 \ldots 0\ d_{p_2}\ 0 \ldots 0\ d_{p_3}\ 0 \ldots 0]_{N \times N}$.
The foregoing $p_1=1$, $p_2=4$, and $p_3=8$ are used as an example to obtain:
$\overline{d}^{l,m}=[b_1^{l,m}\ 0\ 0\ b_4^{l,m}\ 0 \ldots 0\ b_8^{l,m} 0 \ldots 0]^T_{N \times 1}$, and
$\overline{U}_t=[d_1\ 0\ 0\ d_4\ 0 \ldots 0\ d_8\ 0 \ldots 0]_{N \times N}$.

The foregoing uses K=1 as an example to describe in detail a specific process in which the network device determines an estimation value of a spatial-frequency coefficient vector of one spatial-frequency vector pair based on the P time domain vectors and the time domain coefficients corresponding to the P time domain vectors. Certainly, the network device may alternatively determine estimation values of spatial-frequency coefficient vectors of a plurality of spatial-frequency vector pairs based on the P time domain vectors and the time domain coefficients corresponding to the P time domain vectors. That is, K>1.

When K>1, the network device may first determine, from the P time domain vectors and the time domain coefficients corresponding to the P time domain vectors, one or more time domain vectors and one or more time domain coefficients corresponding to each spatial-frequency vector pair. For example, for the $k^{th}$ spatial-frequency vector pair, the network device may determine the $P_k$ time domain vectors and the time domain coefficients corresponding to the $P_k$ time domain vectors. The $P_k$ time domain vectors and the time domain coefficients corresponding to the $P_k$ time domain vectors that are determined based on the $k^{th}$ spatial-frequency vector pair may be used to determine the estimation value of the spatial-frequency coefficient vector corresponding to the $k^{th}$ spatial-frequency vector pair. A specific process is the same as the foregoing specific process in which the network device determines the estimation value of the spatial-frequency coefficient vector when K=1. For brevity, details are not described herein again.

Assuming that the spatial-frequency coefficient vectors determined by the network device based on the P time domain vectors and the time domain coefficients corresponding to the P time domain vectors are vectors whose lengths are N, the network device may determine the spatial-frequency coefficients corresponding to the K spatial-frequency vector pairs at each of the N measurement moments. The network device may further construct a spatial-frequency matrix at each measurement moment based on the K spatial-frequency vector pairs and the spatial-frequency coefficient vector corresponding to each spatial-frequency vector pair. It should be understood that, the determined spatial-frequency matrix is the estimation value of the spatial-frequency matrix. To distinguish from the foregoing spatial-frequency matrix H determined by the terminal device based on channel measurement, the estimation value of the spatial-frequency matrix is represented by $\tilde{H}$.

For example, the network device may determine a spatial-frequency matrix at any one of the N measurement moments based on the K spatial-frequency vector pairs and the spatial-frequency coefficient vector of each spatial-frequency vector pair. For example, the spatial-frequency matrix at the $n^{th}$ measurement moment may be expressed as $$\tilde{H}_n = \sum_{m=1}^{M} \sum_{l=1}^{L} g_n^{l,m} u_l v_m^H \cdot g_n^{l,m}$$

indicates an $n^{th}$ element in a spatial-frequency coefficient vector $\tilde{c}^{l,m}$ corresponding to the spatial-frequency vector pair obtained by combining the $l^{th}$ spatial domain vector $u_l$ and the $m^{th}$ frequency domain vector $v_m$, and $$\tilde{c}^{l,m} = \sum_{i=1}^{P} b_{p_i}^{l,m} d_{p_i}^{l,m}.$$

The network device may determine, based on the spatial-frequency matrix after an $N^{th}$ measurement moment, a precoding matrix used for downlink data transmission. A specific method for determining the precoding matrix by the network device based on the spatial-frequency matrix has been briefly described above. For details, refer to the conventional technology. For brevity, details are not described herein again.

Actually, the network device is not limited to determining spatial-frequency matrices or precoding matrices at the N measurement moments based on the P time domain vectors and the time domain coefficients corresponding to the P time domain vectors. Based on the P time domain vectors and the time domain coefficients corresponding to the P time domain vectors that are determined above, the network device may further predict a spatial-frequency matrix or a precoding matrix at a future moment.

In an implementation, the network device may predict a spatial-frequency coefficient vector at a future moment based on the spatial-frequency coefficient vectors of the K spatial-frequency vector pairs, and then determine a spatial-frequency matrix at the future moment based on the predicted spatial-frequency coefficient vector. In another implementation, the network device may first determine the spatial-frequency matrices at the N measurement moments by using the spatial-frequency coefficient vectors of the K spatial-frequency vector pairs, and then predict a spatial-frequency matrix at a future moment based on the spatial-frequency matrices at the N measurement moments.

In a possible implementation, the network device may perform channel prediction by using an autoregressive model (AR). According to the NR protocol 38.901, a historical channel of a time-varying channel is correlated with a subsequent channel, and the correlation may be represented as several slowly varying or unchanged coefficients. That is, a channel at any moment may be represented as weighting coefficients of specific coefficients (for example, $\beta_1, \beta_2, \ldots,$ and $\beta_E$ in the following formula) of a channel at several previous moments. According to the following formula, the network device may predict a future spatial-frequency coefficient by using a known spatial-frequency coefficient, and then predict a subsequent channel.

Using N time domain coefficients $g_1^{l,m}, g_2^{l,m}, \ldots, g_{E-1}^{l,m}, g_E^{l,m}, g_{E+1}^{l,m}, \ldots,$ and $g_N^{l,m}$ corresponding to the spatial-frequency vector pair $(u_l, v_m)$ as an example, $$\begin{bmatrix} g_1^{l,m} & \cdots & g_E^{l,m} \\ \vdots & \ddots & \vdots \\ g_{N-E}^{l,m} & \cdots & g_{N-1}^{l,m} \end{bmatrix} \begin{bmatrix} \beta_1 \\ \vdots \\ \beta_E \end{bmatrix} = \begin{bmatrix} g_{E+1}^{l,m} \\ \vdots \\ g_N^{l,m} \end{bmatrix}, 1 \leq E \leq N,$$

and E is an integer.

Based on the foregoing method, the network device may predict a channel at any moment after the N measurement moments. For example, $g_{N+1}^{l,m} = \beta_1 g_{N-E+1}^{l,m} + \ldots + B_E g_N^{l,m}$. $g_{N+1}^{l,m}$ is a spatial-frequency coefficient that is of the spatial-frequency vector pair $(u_l, v_m)$ and that matches a channel at a future moment. During specific implementation, $g_n^{l,m}$ in the foregoing formula may alternatively be replaced with $\tilde{H}_n$. A specific implementation is similar to that in the foregoing descriptions. For brevity, details are not described herein again.

It should be understood that, merely for ease of understanding, the foregoing shows a possible implementation in which the network device predicts the channel at the future moment. However, this shall not constitute any limitation on this application. Based on a same concept, a person skilled in the art may predict the channel based on different algorithms. A specific implementation in which the network device predicts the channel is not limited in this application.

After predicting the spatial-frequency matrix at the future moment, the network device may determine a precoding matrix used for downlink transmission at the moment. A time-varying feature of the channel is considered for the determined precoding matrix, so that the precoding matrix can well adapt to a downlink channel.

Correspondingly, if the terminal device determines, based on the feedback manner for dual-domain compression, the precoding matrix used for downlink transmission, the terminal device may be confronted with a problem of CSI expiration. For ease of understanding, a process of providing a CSI feedback based on an existing CSI feedback procedure and the confronting problem of CSI expiration are described herein in detail with reference to FIG. 4.

Figure 4:
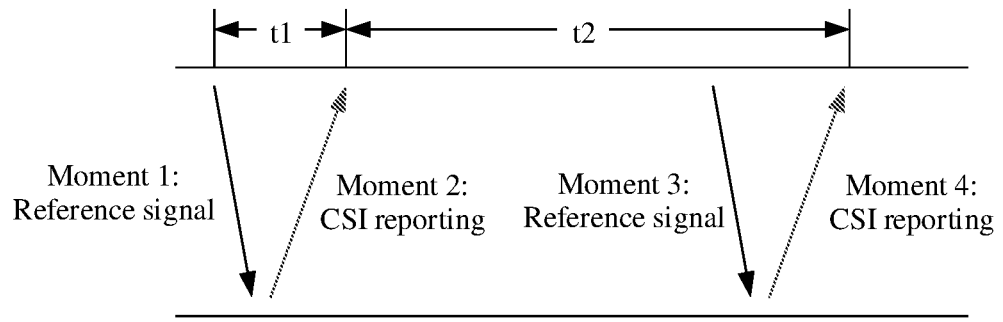
FIG. 4 is a schematic flowchart of providing a CSI feedback based on an existing channel state information (CSI) feedback procedure.

FIG. 4 is a schematic flowchart of providing a CSI feedback based on the feedback manner for dual-domain compression according to an embodiment of this application. As shown in FIG. 4, the network device sends a reference signal at a moment 1, and after receiving the reference signal, the terminal device may perform channel measurement and provide a feedback at a moment 2. Because the network device may send reference signals periodically, aperiodically, or semi-persistently, there may be a period of time between a moment at which a reference signal is sent the last time by the network device and a moment at which a reference signal is sent next time. As shown in FIG. 4, the network device sends a reference signal next time at a moment 3, and the terminal device performs channel measurement and provides a feedback at a moment 4 based on the reference signal sent next time. It can be learned that there is a time interval t1 between the moment 1 and the moment 2, and there is a time interval t2 between the moment 2 and the moment 4. During the time interval t2, all precoding matrices used by the network device to perform downlink transmission are determined based on a feedback received at the moment 2. However, the channel may have changed during the time interval t2, and if the precoding matrix determined based on the feedback at the moment 2 is directly used to perform precoding for subsequent downlink transmission, the precoding matrix may fail to well adapt to a downlink channel. Consequently, transmission performance may be degraded. This case in which a precoding matrix determined based on a feedback cannot match an actual channel because a channel changes with time is referred to as CSI expiration. In other words, when the channel changes rapidly with time, CSI expiration may cause significant degradation in the transmission performance.

Correspondingly, in the embodiments of this application, the terminal device performs channel measurement based on reference signals sent by the network device at a plurality of different moments, and feeds back a change of a channel with time to the network device by using a quantized weighted sum of time domain vectors. The network device may predict a channel at a future moment based on the change of the channel with time, and further determine a precoding matrix that adapts to the channel. Therefore, a problem of transmission performance degradation caused by CSI expiration is alleviated, and this helps improve system performance.

Figure 5:
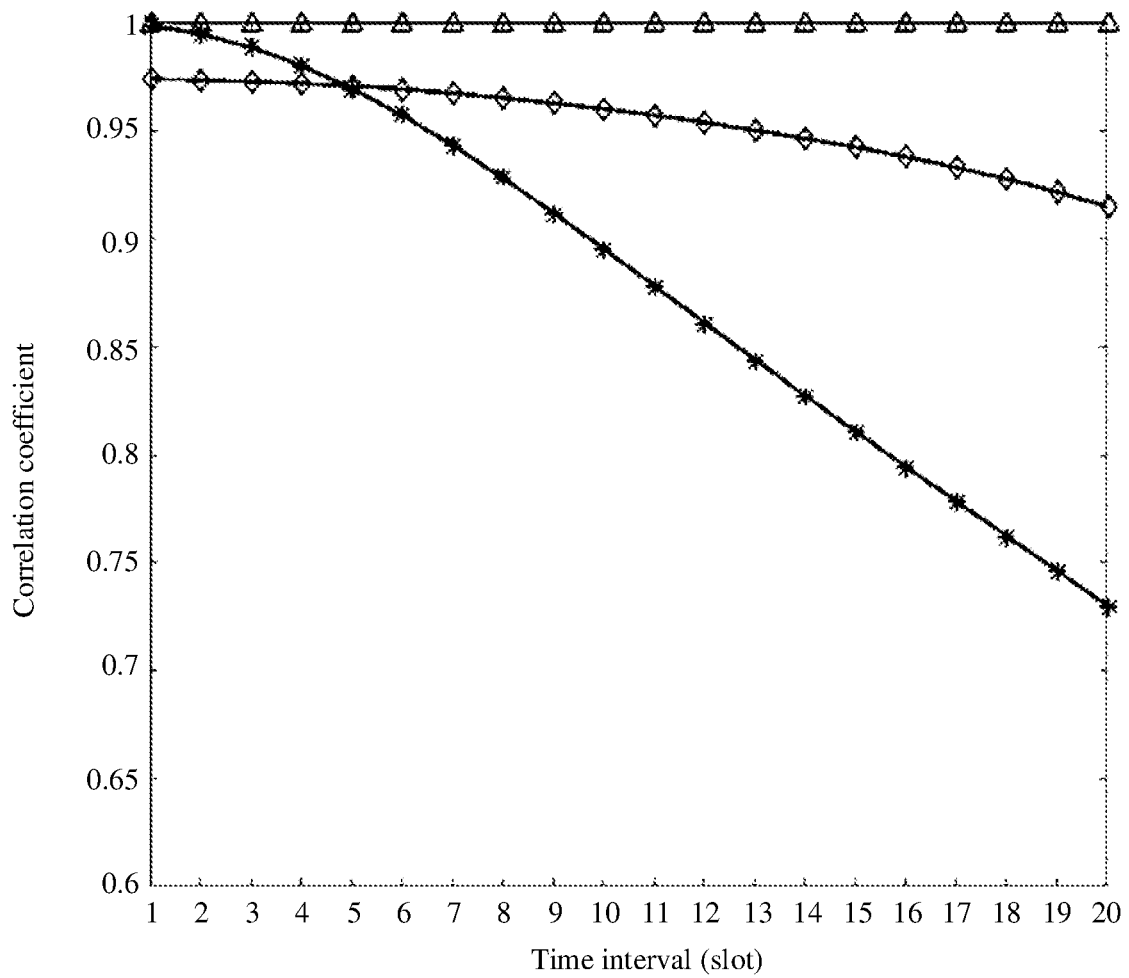
FIG. 5 is an effect simulation diagram according to an embodiment of this application.

To better understand beneficial effects achieved by the embodiments of this application, FIG. 5 shows a correlation between precoding matrices that correspond to a channel and that are constructed at different moments based on different feedback manners and a precoding matrix corresponding to an actual channel. FIG. 5 is an effect simulation diagram according to an embodiment of this application. FIG. 5 is obtained through simulation based on the following assumptions, including a quantity of transmit antennas of the network device is 64, a quantity of receive antennas of the terminal device is 1, a carrier frequency is 3.5 GHz, a subcarrier spacing is 30 kHz, a bandwidth is 50 resource blocks (RBs), and the moving speed of the terminal device is 30 kilometers per hour (km/h). A horizontal axis in the figure indicates a time interval in a unit of a slot. A vertical axis in the figure indicates a correlation coefficient, used to represent a correlation between precoding matrices that correspond to a channel and that are constructed based on different feedback manners and a precoding matrix corresponding to an actual channel.

A curve formed by connecting triangles in the figure indicates a correlation coefficient between precoding matrices corresponding to an actual channel. It may be understood that the correlation coefficient is always 1. A curve formed by connecting diamonds in the figure indicates a correlation coefficient (for ease of distinguishing, for example, denoted as a correlation coefficient 1) between precoding matrices that correspond to the channel and that are constructed (or predicted) at different moments based on the channel measurement method provided in the embodiments of this application and the precoding matrix corresponding to the actual channel. A curve formed by connecting stars in the figure indicates a correlation coefficient (for example, for ease of distinguishing, denoted as a correlation coefficient 2) between a precoding matrix that corresponds to the channel and that is constructed based on a previous feedback from the terminal device in the conventional technology and the precoding matrix corresponding to the actual channel. It can be learned that the correlation coefficient 1 shows a tendency to be higher than the correlation coefficient 2 over time. In other words, compared with the precoding matrix determined based on the previous feedback from the terminal device in the conventional technology, the precoding matrix determined by predicting a future channel based on the method provided in the embodiments of this application can better match the actual channel. Therefore, the problem of performance degradation caused by CSI expiration is alleviated, and this helps improve the system performance.

It should be understood that, the simulation curve and the assumption condition shown in FIG. 5 are merely examples for ease of understanding of the embodiments of this application, and this shall not constitute any limitation on this application.

It should be further understood that, in the foregoing embodiments, merely for ease of understanding, dual-domain compression is used as an example to describe a specific process in which the terminal device determines the P component features of the time-varying feature and the time domain coefficients corresponding to the P component features and a specific process in which the network device determines, based on the feedback, the P component features and the weighting coefficients corresponding to the P component features. However, this shall not constitute any limitation on this application. For example, the terminal device may alternatively determine the component feature of the time-varying feature and the weighting coefficient of the component feature based on the type II codebook feedback manner. In this case, the terminal device may assume that the beam vector used to restore the precoding matrix remains unchanged, and determine, based on a change of a wideband amplitude coefficient or a subband coefficient of the beam vector with time, the P component features of the time-varying feature of the channel and the weighting coefficients corresponding to the P component features. The network device may approximately restore the precoding matrix based on the P component features and the weighting coefficients corresponding to the P component features that are determined by the terminal device. For brevity, examples are not described one by one in this application.

It should be further understood that, the foregoing is merely an example, and merely shows a specific process in which the terminal device determines, based on one polarization direction and one transport layer, the P component features and the weighting coefficients corresponding to the P component features. However, this shall not constitute any limitation on this application. When there are a plurality of polarization directions of a transmit antenna, or when a quantity of transport layers is greater than 1, or when the quantity of receive antennas is greater than 1, the terminal device may determine, based on a method the same as that described above, the one or more component features and the weighting coefficient corresponding to the one or more component features. Correspondingly, the network device may also restore the channel based on a method the same as that described above, to determine the precoding matrix.

The foregoing describes in detail the method provided in the embodiments of this application with reference to FIG. 2(a) to FIG. 2(d) to FIG. 5. The following describes in detail apparatuses provided in the embodiments of this application with reference to FIG. 6 to FIG. 8.

Figure 6:
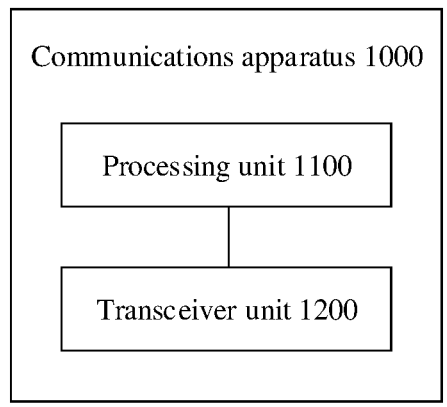
FIG. 6 is a schematic block diagram of a communications apparatus according to an embodiment of this application.

FIG. 6 is a schematic block diagram of a communications apparatus 1000 according to an embodiment of this application. As shown in FIG. 6, the communications apparatus 1000 may include a processing unit 1100 and a transceiver unit 1200.

In a possible design, the communications apparatus 1000 may correspond to the terminal device in the foregoing method embodiments, for example, may be the terminal device, or may be a chip disposed in the terminal device.

Specifically, the communications apparatus 1000 may correspond to the terminal device in the method 300 according to the embodiments of this application. The communications apparatus 1000 may include units configured to perform the method performed by the terminal device in the method 300 in FIG. 3. In addition, the units in the communications apparatus 1000 and the foregoing other operations and/or functions are separately used to implement corresponding procedures of the method 300 in FIG. 3.

When the communications apparatus 1000 is configured to perform the method 300 in FIG. 3, the processing unit 1100 may be configured to perform operation 310 in the method 300, and the transceiver unit 1200 may be configured to perform operation 320 and operation 330 in the method 300. It should be understood that, a specific process in which each unit performs the foregoing corresponding operation has been described in detail in the foregoing method embodiments. For brevity, details are not described herein again.

Figure 7:
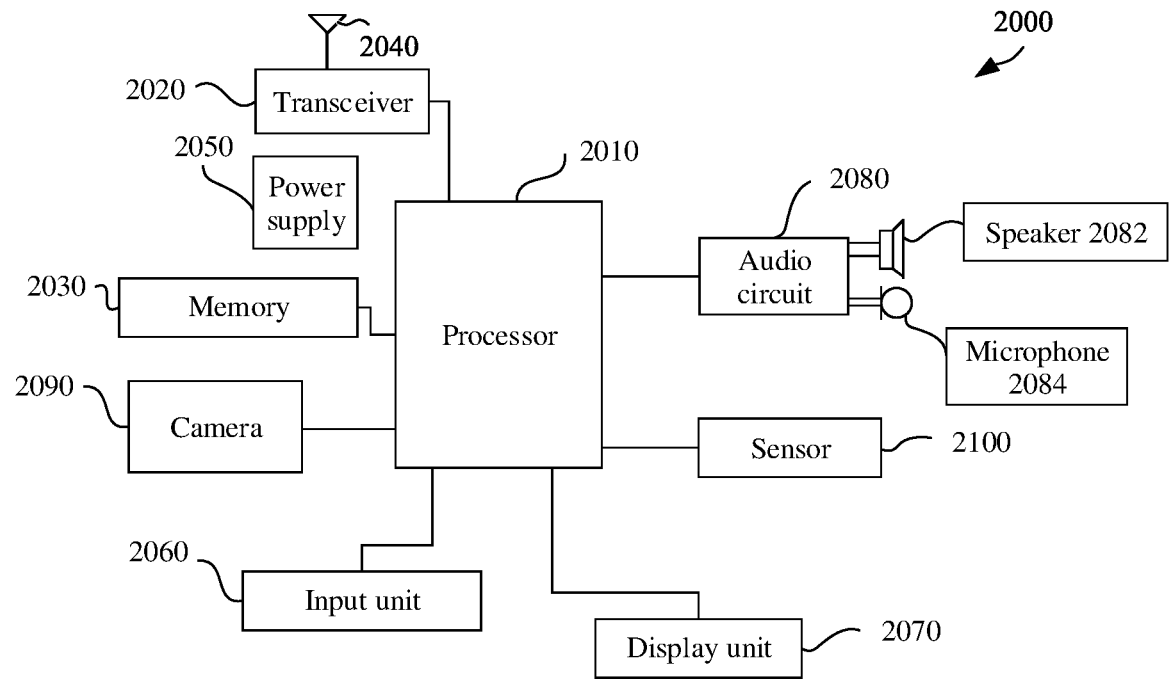
FIG. 7 is a schematic diagram of a structure of a terminal device according to an embodiment of this application.

It should be further understood that, when the communications apparatus 1000 is the terminal device, the transceiver unit 1200 in the communications apparatus 1000 may correspond to a transceiver 2020 in a terminal device 2000 shown in FIG. 7, and the processing unit 1100 in the communications apparatus 1000 may correspond to a processor 2010 in the terminal device 2000 shown in FIG. 7.

It should be further understood that, when the communications apparatus 1000 is the chip disposed in the terminal device, the transceiver unit 1200 in the communications apparatus 1000 may be an input/output interface.

In another possible design, the communications apparatus 1000 may correspond to the network device in the foregoing method embodiments, for example, may be the network device, or a chip disposed in the network device.

Specifically, the communications apparatus 1000 may correspond to the network device in the method 300 according to the embodiments of this application. The communications apparatus 1000 may include units configured to perform the method performed by the network device in the method 300 in FIG. 3. In addition, the units in the communications apparatus 1000 and the foregoing other operations and/or functions are separately used to implement corresponding procedures of the method 300 in FIG. 3.

When the communications apparatus 1000 is configured to perform the method 300 in FIG. 3, the processing unit 1100 may be configured to perform operation 340 and operation 350 in the method 300, and the transceiver unit 1200 may be configured to perform operation 320 and operation 330 in the method 300. It should be understood that, a specific process in which each unit performs the foregoing corresponding operation has been described in detail in the foregoing method embodiments. For brevity, details are not described herein again.

Figure 8:
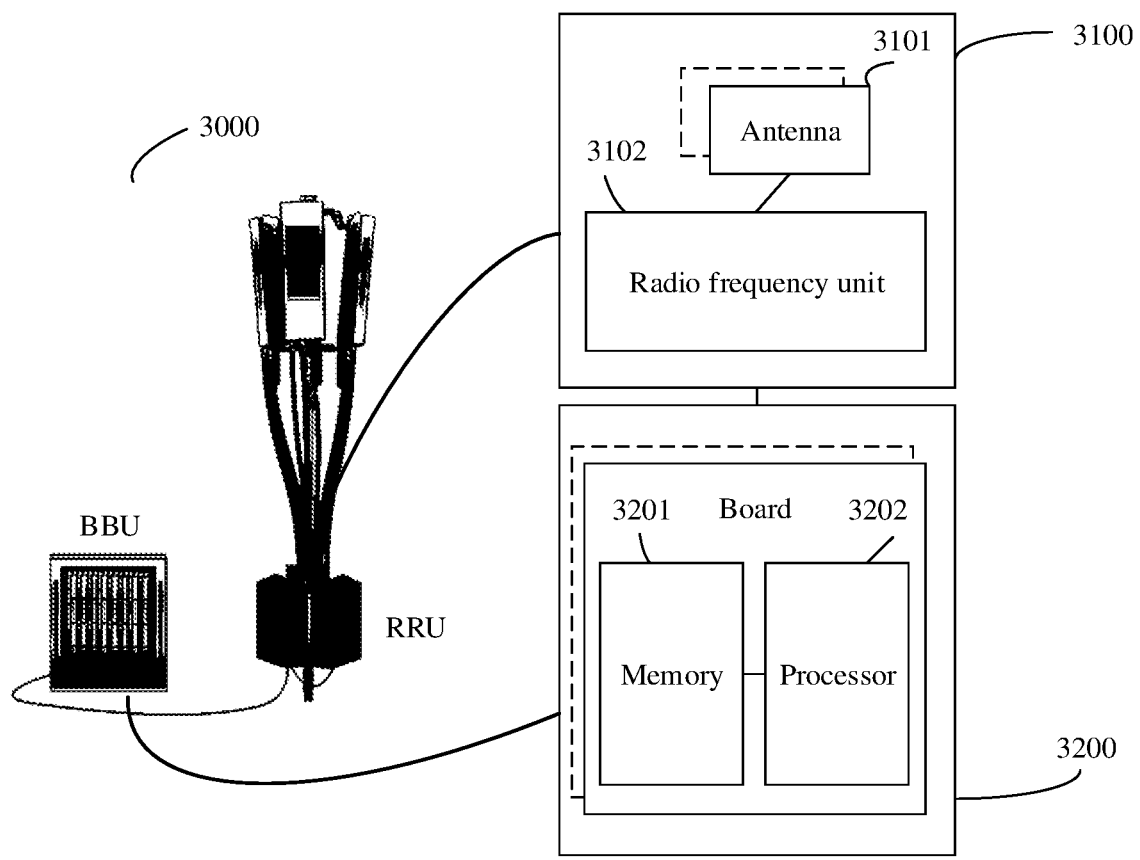
FIG. 8 is a schematic diagram of a structure of a network device according to an embodiment of this application.

It should be further understood that, when the communications apparatus 1000 is the network device, the transceiver unit in the communications apparatus 1000 may correspond to an RRU 3100 in a base station 3000 shown in FIG. 8, and the processing unit 1100 in the communications apparatus 1000 may correspond to a BBU 3200 or a processor 3202 in the base station 3000 shown in FIG. 8.

It should be further understood that, when the communications apparatus 1000 is the chip disposed in the network device, the transceiver unit 1200 in the communications apparatus 1000 may be an input/output interface.

FIG. 7 is a schematic diagram of a structure of the terminal device 2000 according to an embodiment of this application. The terminal device 2000 may be applied to the system shown in FIG. 1, to perform functions of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit 1100 in FIG. 6.

The transceiver 2020 may correspond to the transceiver unit 1200 in FIG. 6, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 7 can implement the processes related to the terminal device in the method embodiment shown in FIG. 3. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, or the audio circuit may further include a speaker 2082, a microphone 2084, and the like.

FIG. 8 is a schematic diagram of a structure of the network device according to an embodiment of this application, for example, may be a schematic diagram of a structure of a base station. The base station 3000 may be applied to the system shown in FIG. 1, to perform functions of the network device in the foregoing method embodiments. As shown in the figure, the base station 3000 may include one or more radio frequency units, for example, one or more remote radio units (RRUs) 3100, and one or more baseband units (BBUs) (which may also be referred to as distributed units (DUs)) 3200. The RRU 3100 may be referred to as a transceiver unit, and corresponds to the transceiver unit 1200 in FIG. 6. Optionally, the transceiver unit may also be referred to as a transceiver, a transceiver circuit, a transceiver, or the like, and may include at least one antenna 3101 and a radio frequency unit 3102. Optionally, the transceiver unit may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to receive and send a radio frequency signal, and perform conversion between the radio frequency signal and a baseband signal. For example, the RRU 3100 is configured to send indication information to a terminal device. The BBU 3200 is mainly configured to perform baseband processing, control the base station, and so on. The RRU 3100 and the BBU 3200 may be physically disposed together, or may be physically disposed separately, to be specific, the base station is a distributed base station.

The BBU 3200 is a control center of the base station, may also be referred to as a processing unit, may correspond to the processing unit 1100 in FIG. 6, and is mainly configured to implement a baseband processing function, for example, channel coding, multiplexing, modulation, and spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be independently disposed on each board. Alternatively, a plurality of boards may share a same memory and a same processor. In addition, a necessary circuit may be further disposed on each board.

It should be understood that, the base station 3000 shown in FIG. 8 can implement processes related to the network device in the method embodiment in FIG. 3. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 320*o* may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

It should be understood that, the base station 3000 shown in FIG. 8 is merely a possible architecture of the network device, and this shall not constitute any limitation on this application. The method provided in this application is applicable to a network device of another architecture, for example, a network device including a CU, a DU, and an active antenna unit (AAU). A specific architecture of the network device is not limited in this application.

An embodiment of this application further provides a processing apparatus, including a processor and an interface. The processor is configured to perform the method in the foregoing method embodiments.

It should be understood that, the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, the operations in the foregoing methods may be implemented by using a hardware integrated logic circuit in the processor, or by using instructions in a form of software. The operations of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that the processor in the embodiments of this application may be an integrated circuit chip, and has a signal processing capability. In an implementation process, the operations in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and logical block diagrams that are disclosed in the embodiments of this application. The general-purpose processor may be a microprocessor, or the processor may be any conventional processor or the like. The operations of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

According to the methods provided in the embodiments of this application, this application further provides a computer program product, and the computer program product includes computer program code. When the computer program code is run on a computer, the computer is enabled to perform the method in the embodiment shown in FIG. 3.

According to the methods provided in the embodiments of this application, this application further provides a computer-readable medium, and the computer-readable medium stores program code. When the program code is run on a computer, the computer is enabled to perform the method in the embodiment shown in FIG. 3.

According to the methods provided in the embodiments of this application, this application further provides a system. The system includes the foregoing one or more terminal devices and the foregoing one or more network devices.

The network device and the terminal device in the foregoing apparatus embodiments correspond to the network device and the terminal device in the method embodiments. A corresponding module or unit performs a corresponding operation. For example, the communications unit (transceiver) performs a receiving or sending operation in the method embodiments, and a operation other than the sending operation and the receiving operation may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

A person of ordinary skill in the art may be aware that, various illustrative logical blocks (illustrative logical blocks) and operations that are described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

In the foregoing embodiments, all or some of the functions of the functional units may be implemented by software, hardware, firmware, or any combination thereof. When the functions are implemented by using software, all or some of the functions may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
   generating, by a terminal device, first indication information, wherein the first indication information indicates one or more component features of a time-varying feature, and further indicates a weighting coefficient of each component feature of the one or more component features, wherein the weighting coefficient of each component feature corresponds to at least one domain vector selected to construct a precoding vector, wherein a quantity of the domain vectors of the at least one domain vector is preconfigured by a network device using second indication information sent from the network device to the terminal device, and wherein the one or more component features and the weighting coefficient of each component feature represent the time-varying feature of a channel using a weighted sum of the one or more domain vectors; and
   sending, by the terminal device, the first indication information to the network device.

2. The method according to claim 1, wherein the time-varying feature is determined based on reference signals received a plurality of times.

3. The method according to claim 1, wherein the first indication information indicates an index of a time domain vector corresponding to each component feature, in a predefined codebook, of the one or more component features.

4. The method according to claim 3, wherein at least two component features of the one or more component features are determined based on different codebooks.

5. The method according to claim 1, wherein the one or more component features are determined based on one or more predefined codebooks, wherein the one or more codebooks are obtained from a predefined codebook set, and wherein each codebook in the codebook set corresponds to a value of one or more of a measurement duration, a pilot time-domain density, a quantity of pilot transmissions, or a pilot transmission periodicity.

6. The method according to claim 1, wherein a component feature of the one or more component features of the time-varying feature is a Doppler shift, and wherein the weighting coefficient of the component feature is a Doppler coefficient.

7. A channel measurement method, comprising:
   preconfiguring, by a network device, using second indication information sent from the network device to a terminal device, a quantity of domain vectors of at least one domain vector;
   receiving, by the network device, first indication information, wherein the first indication information indicates one or more component features of a time-varying feature and further indicates a weighting coefficient of each component feature of the one or more component features, wherein the weighting coefficient of each component feature corresponds to the at least one domain vector selected to construct a precoding vector, and wherein the one or more component features and the weighting coefficient of each component feature represent the time-varying feature of a channel using a weighted sum of the one or more domain vectors; and
   determining, by the network device based on the first indication information, the one or more component features and the weighting coefficient of each component feature.

8. The method according to claim 7, wherein the time-varying feature is determined by a terminal device based on reference signals received a plurality of times.

9. The method according to claim 7, wherein the first indication information indicate an index of a time domain vector corresponding to each component feature, in a predefined codebook, of the one or more component features.

10. The method according to claim 9, wherein at least two component features of the one or more component features are determined based on different codebooks.

11. The method according to claim 7, wherein the one or more component features are determined based on one or more predefined codebooks, wherein the one or more codebooks are obtained from a predefined codebook set, and wherein each codebook in the codebook set corresponds to a value of one or more of a measurement duration, a pilot time-domain density, a quantity of pilot transmissions, or a pilot transmission periodicity.

12. The method according to claim 7, wherein a component feature of the one or more component features of the time-varying feature is a Doppler shift, and wherein the weighting coefficient of the component feature is a Doppler coefficient.

13. A communications apparatus, comprising:
    at least one processor;
    a non-transitory memory configured storing a computer program for execution by the at least one processor, wherein the computer program includes instructions to:
    generate first indication information, wherein the first indication information indicates one or more component features of a time-varying feature and further indicates a weighting coefficient of each component feature of the one or more component features, wherein the weighting coefficient of each component feature corresponds to at least one domain vector selected to construct a precoding vector, wherein a quantity of the domain vectors of the at least one domain vector is preconfigured by a network device using second indication information sent from the network device to the communications apparatus, and wherein the one or more component features and the weighting coefficient of each component feature represent the time-varying feature of a channel using a weighted sum of the one or more domain vectors; and send the first indication information.

14. The apparatus according to claim 13, wherein the time-varying feature is determined based on reference signals received a plurality of times.

15. The apparatus according to claim 13, wherein the first indication information indicates an index of a time domain vector corresponding to each component feature, in a predefined codebook, of the one or more component features.

16. The apparatus according to claim 15, wherein at least two component features of the one or more component features are determined based on different codebooks.

17. The apparatus according to claim 13, wherein the one or more component features are determined based on one or more predefined codebooks, wherein the one or more codebooks are obtained from a predefined codebook set, and wherein each codebook in the codebook set corresponds to a value of one or more of a measurement duration, a pilot time-domain density, a quantity of pilot transmissions, or a pilot transmission periodicity.

18. The apparatus according to claim 13, wherein a component feature of the one or more component features of the time-varying feature is a Doppler shift, and wherein the weighting coefficient of the component feature is a Doppler coefficient.

19. A communications apparatus, comprising:
at least one processor;
a non-transitory memory configured storing a computer program for execution by the at least one processor, wherein the computer program includes instructions to:

preconfigure, using second indication information sent from the communications apparatus to a terminal device, a quantity of domain vectors of at least one domain vector;

receive first indication information, wherein the first indication information indicates one or more component features of a time-varying feature and further indicates a weighting coefficient of each component feature, wherein the weighting coefficient of each component feature corresponds to the at least one domain vector selected to construct a precoding vector, and wherein the one or more component features and the weighting coefficient of each component feature represent the time-varying feature of a channel using a weighted sum of the one or more domain vectors; and determine, based on the first indication information, the one or more component features and the weighting coefficient of each component feature.

20. The apparatus according to claim 19, wherein the time-varying feature is determined by a terminal device based on reference signals received a plurality of times.

21. The apparatus according to claim 19, wherein the first indication information indicates an index of a time domain vector corresponding to each component feature, in a predefined codebook, of the one or more component features.

22. The apparatus according to claim 21, wherein at least two component features of the one or more component features are determined based on different codebooks.

23. The apparatus according to claim 19, wherein the one or more component features are determined based on one or more predefined codebooks, wherein the one or more codebooks are obtained from a predefined codebook set, and wherein each codebook in the codebook set corresponds to a value of one or more of a measurement duration, a pilot time-domain density, a quantity of pilot transmissions, or a pilot transmission periodicity.

24. The apparatus according to claim 19, wherein a component feature of the one or more component features of the time-varying feature is a Doppler shift, and wherein the weighting coefficient of the component feature is a Doppler coefficient.

* * * * *